(12) United States Patent
Bartek et al.

(10) Patent No.: US 8,288,600 B2
(45) Date of Patent: Oct. 16, 2012

(54) METHODS FOR CO-PROCESSING OF BIOMASS AND PETROLEUM FEED

(75) Inventors: Robert Bartek, Centennial, CO (US); Michael Brady, Studio City, CA (US); Dennis Stamires, Dana Point, CA (US); Steve Yanik, Colorado Springs, CO (US); Paul O'Connor, Hoevelaken (NL); Jacobus Cornelius Rasser, Redondo Beach, CA (US)

(73) Assignee: KiOR Inc., Pasadena, TX (US)

( * ) Notice: Subject to any disclaimer, the term of this patent is extended or adjusted under 35 U.S.C. 154(b) by 0 days.

(21) Appl. No.: 12/917,988

(22) Filed: Nov. 2, 2010

(65) Prior Publication Data

US 2011/0154720 A1 Jun. 30, 2011

Related U.S. Application Data

(63) Continuation-in-part of application No. PCT/US2010/035940, filed on May 24, 2010.

(60) Provisional application No. 61/220,794, filed on Jun. 26, 2009, provisional application No. 61/180,501, filed on May 22, 2009.

(51) Int. Cl.
*C10L 1/00* (2006.01)

(52) U.S. Cl. ........ 585/240; 585/241; 585/242; 208/142; 208/143; 208/144; 208/145; 208/404; 208/405; 208/415; 44/605; 44/606

(58) Field of Classification Search .......... 208/142–145, 208/404–405, 415–423; 585/240–242; 44/605–606
See application file for complete search history.

(56) References Cited

U.S. PATENT DOCUMENTS

| 2,412,879 | A | 12/1946 | Fischer |
| 3,961,913 | A | 6/1976 | Brenneman et al. |
| 4,064,018 | A | 12/1977 | Choi |
| 4,072,274 | A | 2/1978 | Syrjanen |
| 4,118,281 | A | 10/1978 | Yan |
| 4,147,593 | A | 4/1979 | Frischmuth et al. |
| 4,153,514 | A | 5/1979 | Garrett et al. |

(Continued)

FOREIGN PATENT DOCUMENTS

CA 1283880 5/1991

(Continued)

OTHER PUBLICATIONS

Geldart D. "Types of gas fluidization," Powder Technology, 7(5):285-292, (1973).

(Continued)

*Primary Examiner* — Walter D Griffin
*Assistant Examiner* — Brian McCaig
(74) *Attorney, Agent, or Firm* — Jennifer A. Camacho; Natalie Salem; Greenberg Traurig, LLP

(57) ABSTRACT

A process for producing fuel from biomass is disclosed herein. The process includes torrefying biomass material at a temperature between 80° C. to 400° C. to form particulated biomass having a mean average particle size between 1 µm and 1000 µm. The particulated biomass is mixed with a liquid hydrocarbon to form a suspension, wherein the suspension includes from 1 weight percent to 40 weight percent particulated biomass. The suspension is fed into a unit selected from the group consisting of a pyrolysis reactor, a fluid catalytic cracking unit, a delayed coker, a fluid coker, a hydroprocessing unit, and a hydrocracking unit, and then at least a portion of the particulated biomass of the suspension is converted into fuel.

24 Claims, 4 Drawing Sheets

U.S. PATENT DOCUMENTS

| | | |
|---|---|---|
| 4,266,083 A | 5/1981 | Huang |
| 4,308,411 A | 12/1981 | Frankiewicz |
| 4,342,650 A | 8/1982 | Erickson et al. |
| 4,553,978 A | 11/1985 | Yvan |
| 4,589,927 A | 5/1986 | Allen et al. |
| 4,711,873 A | 12/1987 | Suzukamo et al. |
| 4,851,601 A | 7/1989 | Fukuda et al. |
| 4,874,507 A | 10/1989 | Whitlock |
| 4,987,114 A | 1/1991 | Suzukamo et al. |
| 4,999,328 A | 3/1991 | Jain et al. |
| 5,064,527 A | 11/1991 | Singhal et al. |
| 5,097,088 A | 3/1992 | Fukao et al. |
| 5,102,628 A | 4/1992 | De Lasa |
| 5,115,084 A | 5/1992 | Himmelblau |
| 5,233,109 A | 8/1993 | Chow |
| 5,504,259 A | 4/1996 | Diebold et al. |
| 5,599,510 A | 2/1997 | Kaminski et al. |
| 5,728,271 A | 3/1998 | Piskorz et al. |
| 5,792,340 A | 8/1998 | Freel et al. |
| 5,865,898 A | 2/1999 | Hotzapple et al. |
| 5,959,167 A | 9/1999 | Shabtai et al. |
| 5,961,786 A | 10/1999 | Freel et al. |
| 6,022,419 A | 2/2000 | Torget et al. |
| 6,069,012 A | 5/2000 | Kayser |
| 6,248,297 B1 | 6/2001 | Stine et al. |
| 6,485,774 B1 | 11/2002 | Bransby |
| 6,814,940 B1 | 11/2004 | Hiltunen et al. |
| 6,830,597 B1 | 12/2004 | Green |
| 6,971,594 B1 | 12/2005 | Polifka |
| 7,044,999 B2 | 5/2006 | Bankstahl et al. |
| 7,202,389 B1 | 4/2007 | Brem |
| 7,262,331 B2 | 8/2007 | Van de Beld et al. |
| 7,341,973 B2 | 3/2008 | Flego et al. |
| 7,503,981 B2 | 3/2009 | Wyman |
| 2004/0180971 A1 | 9/2004 | Inoue et al. |
| 2005/0145542 A1 | 7/2005 | O'Connor et al. |
| 2007/0000177 A1 | 1/2007 | Hippo et al. |
| 2007/0213573 A1 | 9/2007 | Ross et al. |
| 2008/0009055 A1 | 1/2008 | Lewnard |
| 2008/0022595 A1 | 1/2008 | Lemaire et al. |
| 2008/0076945 A1 | 3/2008 | Marker et al. |
| 2008/0149896 A1 | 6/2008 | Lenglet |
| 2009/0013601 A1 | 1/2009 | Mandich et al. |
| 2009/0013603 A1 | 1/2009 | Rolland |
| 2009/0056225 A1 | 3/2009 | Schinski |
| 2009/0090046 A1 | 4/2009 | O'Connor et al. |
| 2009/0093555 A1 | 4/2009 | Stites et al. |
| 2009/0139851 A1 | 6/2009 | Freel |
| 2009/0165378 A1 | 7/2009 | Agblevor |
| 2009/0227823 A1 | 9/2009 | Huber et al. |
| 2010/0105970 A1 | 4/2010 | Yanik et al. |
| 2010/0187162 A1 | 7/2010 | O'Connor et al. |
| 2010/0204378 A1 | 8/2010 | O'Connor |
| 2010/0205858 A1 | 8/2010 | O'Connor |
| 2011/0094147 A1 | 4/2011 | Bartek et al. |
| 2011/0099888 A1 | 5/2011 | Bartek et al. |
| 2011/0114765 A1 | 5/2011 | Brady et al. |
| 2011/0114876 A1 | 5/2011 | Brady et al. |

FOREIGN PATENT DOCUMENTS

| | | |
|---|---|---|
| CA | 2618000 A1 | 2/2007 |
| DE | 202006012176 | 12/2006 |
| EP | 1719811 A1 | 11/2006 |
| EP | 1852466 A1 | 11/2007 |
| EP | 1852490 A1 | 11/2007 |
| EP | 1852492 A1 | 11/2007 |
| EP | 1878783 A1 | 1/2008 |
| EP | 1889870 | 2/2008 |
| EP | 1892280 | 2/2008 |
| EP | 2105456 | 9/2009 |
| EP | 2105486 A1 | 9/2009 |
| EP | 2107100 A1 | 10/2009 |
| WO | WO81/01713 A1 | 6/1981 |
| WO | WO02/14040 A1 | 2/2002 |
| WO | WO02/083816 A1 | 10/2002 |
| WO | WO2006/117006 A1 | 11/2006 |
| WO | WO2007/128798 A1 | 11/2007 |
| WO | WO2007/128799 A1 | 11/2007 |
| WO | WO2007/128800 A1 | 11/2007 |
| WO | WO2008/009643 A2 | 1/2008 |
| WO | WO2008/011598 A2 | 1/2008 |
| WO | WO 2008/020047 | 2/2008 |
| WO | WO2008/101949 A1 | 8/2008 |
| WO | W02009/118352 A1 | 10/2009 |
| WO | WO2009/143017 A1 | 11/2009 |
| WO | WO2010/002792 A2 | 1/2010 |
| WO | WO 2010/068773 | 6/2010 |
| WO | WO 2010/071677 | 6/2010 |
| WO | WO 2010/075405 | 7/2010 |
| WO | WO 2010/075429 | 7/2010 |
| WO | WO 2010/111396 | 9/2010 |
| WO | WO 2010/135734 | 11/2010 |

OTHER PUBLICATIONS

McKendry, P., "Energy production from biomass (part 1):overview of biomass," Bioresource Technology, 83(1):37-46, (May 2002).

Sato T. et al. "Development of Liquefaction Technique of Pulverized Ligneous Biomass Powder," American Institute of Chemical Engineers Annual Meeting, 2004, pp. 2649-2656.

International Search Report for International Application No. PCT/US2010/35940, mailed Jul. 13, 2010.

Lappas, A.A., et al. "Biomass Pyrolysis in a Circulating Fluid Bed Reactor for the Production of Fuels and Chemicals" Fuel IPC Science and Technology Press, Guildford, GB, vol. 81, No. 16, Nov. 1, 2002, pp. 2087-2095, XP004374414, ISSN: 0016-2361.

Huber, George, W., et al. "Synthesis of Transportation Fuels From Biomass: Chemistry, Catalysts and Engineering" Chem.Rev.,; Chemical Reviews, Sep. 2006, vol. 106, No. 9, pp. 40-44-4098, 4047-4048, 4061-4063, 4085, 4092-4093, XP002490759.

McKendry, P., "Energy Production From Biomass," Bioresource Technology 83 (2002) p. 37-46.

Wyman, et al, "Coordinated Development of Leading Biomass Pretreatment Technologies" Bioresource Technology 96 (2005) 1959-1966.

Bridgwater, A.V. "Principles and Practice of Biomass Fast Pyrolysis Processes for Liquids" Journal of Analytical and Applied Pyrolysis, Jul. 1999 vol. 51, pp. 3-22, p. 15, para 4 to p. 16 para 2; p. 18, para 2.

Bridgwater, A.V., et al, "Fast Pyrolysis Processes for Biomass," Renewable and Sustainable Energy Reviews 4 (2000) 1-73.

METHODS FOR CO-PROCESSING OF BIOMASS AND PETROLEUM FEED

RELATED APPLICATIONS

This application is a continuation-in-part of International Application No. PCT/US2010/35940, filed on May 24, 2010, which claims the benefit of U.S. Provisional Application No. 61/180,501, filed on May 22, 2009 and of U.S. Provisional Application No. 61/220,794, filed Jun. 26, 2009, the entirety of each of the foregoing applications is hereby incorporated herein by reference.

FIELD OF THE INVENTION

This disclosure relates generally to processes for producing fuel from biomass.

BACKGROUND OF THE INVENTION

Biomass, in particular biomass of plant origin, is recognized as an abundant potential source of fuels and specialty chemicals. See, for example, "Energy production from biomass," by P. McKendry—Bioresource Technology 83 (2002) p 37-46 and "Coordinated development of leading biomass pretreatment technologies" by Wyman et al., Bioresource Technology 96 (2005) 1959-1966. Refined biomass feedstock, such as vegetable oils, starches, and sugars, can be substantially converted to liquid fuels including biodiesel (e.g., methyl or ethyl esters of fatty acids) and ethanol. However, using refined biomass feedstock for fuels and specialty chemicals can divert food sources from animal and human consumption, raising financial and ethical issues.

Alternatively, inedible biomass can be used to produce liquid fuels and specialty chemicals. Examples of inedible biomass include agricultural waste (such as bagasse, straw, corn stover, corn husks, and the like) and specifically grown energy crops (like switch grass and saw grass). Other examples include trees, forestry waste, such as wood chips and saw dust from logging operations, or waste from paper and/or paper mills. In addition, aquacultural sources of biomass, such as algae, are also potential feedstocks for producing fuels and chemicals. Inedible biomass generally includes three main components: lignin, amorphous hemi-cellulose, and crystalline cellulose. Certain components (e.g., lignin) can reduce the chemical and physical accessibility of the biomass, which can reduce the susceptibility to chemical and/or enzymatic conversion.

Attempts to produce fuels and specialty chemicals from biomass can result in low value products (e.g., unsaturated, oxygen containing, and/or annular hydrocarbons). Although such low value products can be upgraded into higher value products (e.g., conventional gasoline, jet fuel), upgrading can require specialized and/or costly conversion processes and/or refineries, which are distinct from and incompatible with conventional petroleum-based conversion processes and refineries. Thus, the wide-spread use and implementation of biomass to produce fuels and specialty chemicals faces many challenges because large-scale production facilities are not widely available and can be expensive to build. Furthermore, existing processes can require extreme conditions (e.g., high temperature and/or pressure, expensive process gasses such as hydrogen, which increases capital and operating costs), require expensive catalysts, suffer low conversion efficiency (e.g., incomplete conversion or inability to convert lingo-cellulosic and hemi-cellulosic material), and/or suffer poor product selectivity.

Therefore, a need remains for novel and improved processes for the conversion of biomass materials to produce fuels and specialty chemicals.

BRIEF SUMMARY OF THE INVENTION

In various embodiments, the invention includes methods, apparatuses, kits, and compositions for converting cellulosic (e.g., including ligno-cellulosic and hemi-cellulosic) material in biomass (e.g., including edible and inedible portions) into fuels and/or specialty chemicals under conditions that can mitigate equipment cost, energy cost, and/or degradation or undesirable reaction of conversion product. Examples of fuels include light gases (e.g., ethane, propane, butane), naphtha, and distillates (e.g., jet fuel, diesel, heating oil). Examples of chemicals include light olefins (e.g., ethylene, propylene, butylenes), acids (e.g., formic and acetic), aldehydes, alcohols (e.g., ethanol, propanol, butanol, phenols), ketones, furans, and the like. For example, the invention includes co-processing a biomass feedstock and a refinery feedstock (or, more generally, a hydrogen donor), which can improve conversion of the biomass into fuels and/or specialty chemicals in conventional petroleum refining processes (e.g., a known refinery unit). The invention also includes adapting existing refinery processes for co-processing biomass feedstock (e.g., modifying operating parameters, catalyst, and feedstock), retrofitting existing refinery process units for processing biomass (e.g., adding a riser for biomass catalytic cracking or adding a biomass feeder system to introduce biomass), and constructing new, purpose-built biomass reactors (e.g., employing commercially-available conventional reactor components). Thus, the methods, apparatuses, kits, and compositions can reduce the cost and increase the availability of fuel and/or specialty chemicals derived from biomass.

Some aspects of the invention relate to a process for producing fuel from biomass feedstock. The process includes torrefying biomass material at a temperature suitable to form particulated biomass having a mean average particle size within the range of 1 µm-1000 µm. In one embodiment, the biomass material is torrefied at a temperature ranging from 80° C. to 400° C. The particulated biomass is then mixed with a liquid hydrocarbon to form a suspension. In certain embodiments, the suspension includes between 1 weight percent to 40 weight percent particulated biomass. The suspension is fed into a unit selected from the group consisting of a pyrolysis reactor, a fluid catalytic cracking unit, a delayed coker, a fluid coker, a hydroprocessing unit, and a hydrocracking unit, and, optionally, at least a portion of the particulated biomass of the suspension may be converted into fuel.

In some embodiments, the process further comprises heating the suspension, prior to feeding the suspension into the unit, to a temperature between 300° C. and 500° C., alternatively between 380° C. and 400° C. The suspension can be torrefied prior to feeding the suspension into the unit.

In certain embodiments, the process further comprises demineralizing mineral-containing biomass material to form biomass material prior to torrefying the biomass material. With demineralizing, the process may further comprise soaking the solid biomass material with a solvent, and subsequently removing at least part of the solvent, wherein the solvent is selected from the group consisting of: an aqueous solvent, a mineral acid, an organic acid, an acetic acid and a carbolic acid, wherein the solvent has a pH of less than about 7, alternatively the pH of the solvent is between 2 and 5. Following demineralization, the biomass material has a mineral content of less than about 2.5 weight percent, alternatively less than about 1 weight percent, alternatively less than about 0.5 weight percent, based on a total composition of the biomass material.

In some embodiments, the liquid hydrocarbon is obtained from a refinery stream. The liquid hydrocarbon material can be selected from the group consisting of naphtha, gasoil, light cycle oil, heavy cycle oil, atmospheric residuum, vacuum residuum, fluid catalytic cracking ("FCC") bottoms, aromatic furfural extract, slurry oil, decant oil, de-asphalted oil, crude oil, atmospheric tower bottoms, atmospheric gas oil, vacuum gas oil, light vacuum gas oil, heavy vacuum gas oil, clarified slurry oil, hydrotreated vacuum gas oil, hydrotreated de-asphalted oil, coker gas oil, hydrotreated coker gas oil, and mixtures thereof.

In some embodiments, the process further comprises contacting the suspension with a heat-carrier material in the unit. In certain embodiments, the heat-carrier material is an inert material. In other embodiments, the heat carrier material comprises a catalyst. The catalyst can have a material selected from the group consisting of a zeolite, a hydrotalcite or a calcinated hydrotalcite, a hydrotalcite-like material or a calcinated a hydrotalcite-like material, a clay or a calcinated clay, a layered hydroxy salt or a calcinated layered hydroxy salt, a mixed metal oxide or a calcinated mixed metal oxide, alumina, a supported noble metal, a transition metal and mixtures thereof. In some embodiments, the catalyst is selected from the group consisting of a petroleum coke, a cobalt molybdate, a nickel molybdate, and a tungstate hydroprocessing catalyst.

In some aspects of the invention, the process comprises forming a biomass-catalyst composite prior to the torrefying step. The catalyst can be an acidic catalyst or a basic catalyst. In certain embodiments, methods, apparatuses, and/or kits can include instructions to retrofit a preexisting conventional refinery unit for liquefying the biomass-catalyst mixture to produce a liquefied biomass feedstock.

In another aspect, the invention features a biomass material catalytic cracking system. The system includes a first riser, a second riser, a first stripper, a second stripper, a knock out drum, a regenerator, and a catalyst cooler. Optionally, the system further includes any one or more of the following components: a kneader, a cyclone, a tower, a second knock out drum, and a third riser. Also provided herein are methods of modifying a preexisting catalytic cracking system. According to one embodiment, the preexisting catalytic cracking system includes a first riser, a second riser, a first stripper, a second stripper, a knock out drum, and a regenerator.

While the fuels and methods thereof will be described in connection with various preferred illustrative embodiments, it will be understood that it is not intended to limit the fuels and methods thereof to those embodiments. On the contrary, it is intended to cover all alternatives, modifications, and equivalents as may be included within the spirit and scope of the invention as defined by the appended claims.

BRIEF DESCRIPTION OF THE DRAWINGS

The drawings are not to scale and certain features are shown exaggerated in scale or in schematic form in the interest of clarity and conciseness.

DETAILED DESCRIPTION OF THE INVENTION

Figure 1:
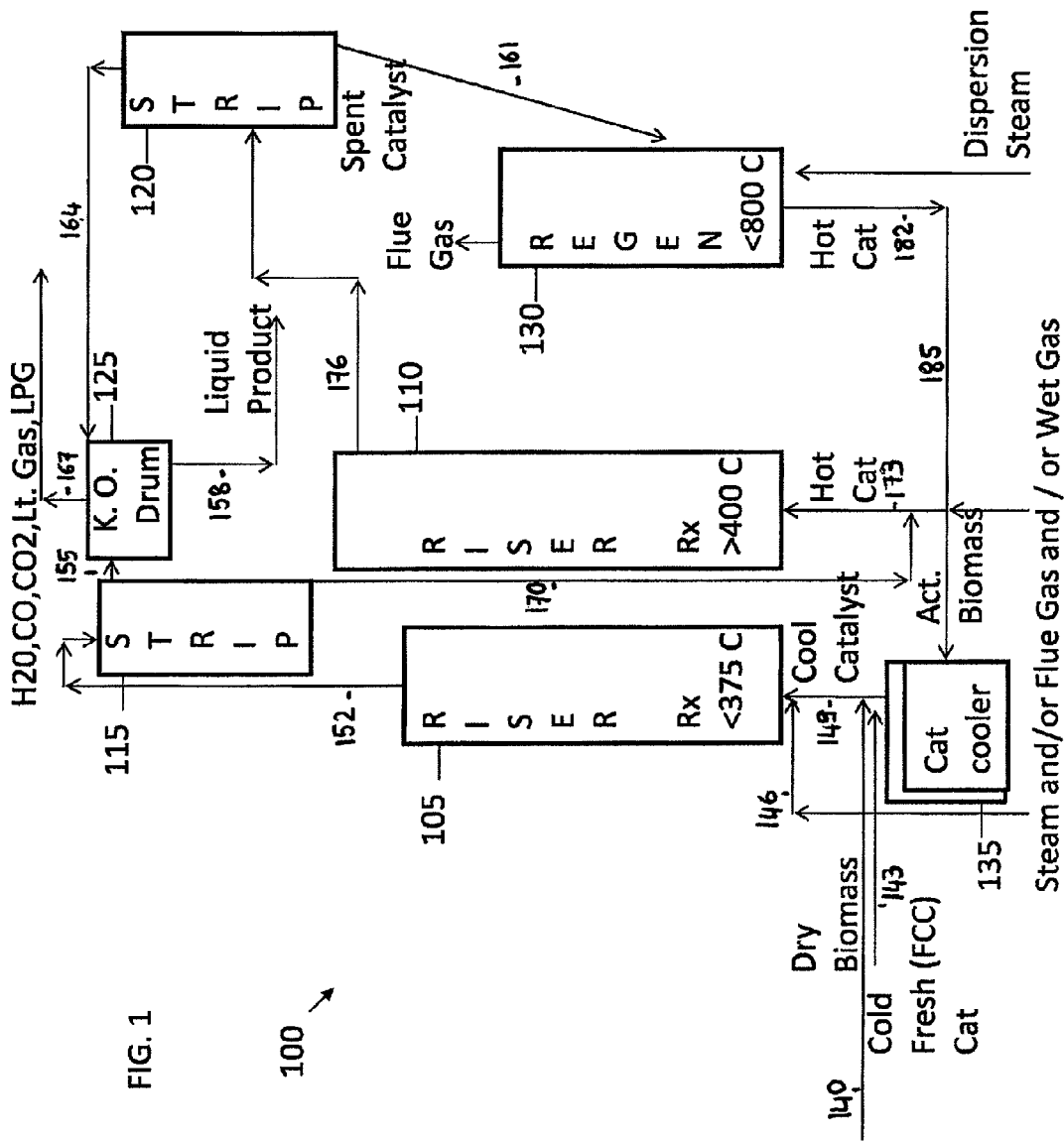
FIG. 1 illustrates an exemplary embodiment of piping and equipment design including two risers, two strippers, a catalyst cooler, a regenerator and a knock out drum.

The invention disclosed herein relate to a process for producing fuel from biomass. Suitable biomasses, or biomass materials, can include any biological material derived from living, or previously living, organisms. In more particularity, non-limiting examples of biomasses suitable for use in the process described herein can include inedible materials, which do not compete with the food supply as well as materials that can be easily grown, or materials that are otherwise readily available, such as: grasses (including, for example, switch grass), saw dust, wood chips, wood bark, twigs, straw, corn stover, cotton linters, bagasse, and the like. In various embodiments, biomasses include materials of photosynthetic origin (e.g., plants), having such as, for example, materials made predominately of cellulose, hemicellulose, or lignin.

Aspects of the invention relates to a process for organophilizing a particulated solid biomass material. The process may include pretreating the biomass material such that the biomass material is physically compatible with liquid hydrocarbon material(s) (described in detail below). By "physical compatibility", it is meant that the solid biomass material may be efficiently carried by the liquid hydrocarbon material. In a non-limiting example, reducing the particle size of the biomass processing to a sufficiently small size permits the biomass material to be evenly distributed in the liquid hydrocarbon material, and to be mixed, effectively suspended, or actually suspended in the liquid hydrocarbon material, or to form a stable suspension. As used herein the term "suspended" refers to the biomass material being physically compatible with the liquid hydrocarbon, and thus the biomass material may be mixed with the liquid hydrocarbon material or either effectively suspended, or actually suspended within the liquid hydrocarbon material. This step enables the biomass material to be physically compatible with, or otherwise efficiently carried by, the liquid hydrocarbon material. In some embodiments, the preferred particle size to be suspended varies depending on a number of factors, including: the composition of the biomass material, the composition of the liquid hydrocarbon material, the velocity of the liquid hydrocarbon material, the temperature and pressure of the suspension, the material of the conduit (e.g., pipe or tank) holding the suspension, the amount of time the suspension is to remain together, and like considerations. In one embodiment, the suspension of the biomass material and liquid hydrocarbon material are contained within a pipe at a refinery and the biomass material is considered efficiently carried by the liquid hydrocarbon material so long as the pipe does not substantially plug after continued use.

In several aspects of the invention, the biomass is converted using a biomass material catalytic system using one or more risers. In some embodiments, the biomass is converted using a first and a second riser. The first riser can be operated at temperatures allowing the depolymerization of hemicellulose and cellulose wherein the second riser can be operated under higher severities conditions (e.g. higher temperatures and longer residence time) to process the remaining lignin material and intermediate material. In some aspects of the invention, the biomass is pre-treated to facilitate the liquefaction or thermolysis of the biomass components, such as lignin, hemicellulose and cellulose. Pre-treatment, such as selective chemical pre-cracking of the lignin polymer, facilitates the low temperature conversion of cellulose.

Pre-Treating Biomass

In some embodiments, the biomass material is pretreated by mechanical processing, such as, for example, shredding, chipping, milling, kneading, grinding, and the like, until the mean average particle size of biomass material—as a whole—ranges from 1 mm to 10 cm, alternatively from 1 cm to 10 cm. For example, prior to the torrefaction, the solid biomass material is mechanically treated to form particles having a mean particle size in the range of from 1 µm to 10 cm. Alternatively, following pretreatment by mechanical processing the mean average particle size of each, individual, biomass material ranges from 1 µm to 10 cm, alternatively from 1 cm to 10 cm.

In some embodiments, an intimate mixture of the biomass material with a particulate inorganic catalyst material is created, preferably, prior to the torrefaction process, when the solid biomass material is still relatively soft. Suitable methods for creating such intimate mixtures include mechanical process, such as milling, grinding, kneading, extruding, and the like.

The biomass-catalyst mixture can include an inorganic particulate material. An inorganic particulate material can be inert or catalytic. An inorganic material can be present in a crystalline or quasi-crystalline form. Exemplary inert materials include inorganic salts such as the salts of alkali and alkaline earth metals. Although these materials do not necessarily contribute to a subsequent chemical conversion of the polymeric material, it is believed that the formation of discrete particles of these materials within the biomass can work as a wedge to mechanically break up or open the structure of the biomass, which can increase the biomass surface accessible to microorganisms and/or catalysts. In one embodiment, the breaking up or opening is facilitated by crystalline or quasi-crystalline particles.

Inorganic particulate material can have catalytic properties. For example, a catalytic inorganic particulate material can be a metal oxide or hydroxide such as an alumina, silica, silica aluminas clay, zeolite, ionic clay, cationic layered material, layered double hydroxide, smectite, saponite, sepiolite, metal hydroxyl salt, and the like. Carbonates and hydroxides of alkali metals, and the oxides, hydroxides and carbonates of alkali earth metals can also have catalytic properties. Inorganic particulate material can include mixtures of inorganic materials. Inorganic particulate material can include a spent (resid) fluid catalytic cracking catalyst containing (thermally treated) layered material. Employing spent catalyst can involve reusing waste material. The spent catalyst can be pulverized into smaller particles to increasing dispersibility. Inorganic particulate material can also include sandblasting grit. Employing sandblasting grit can involve reusing waste material, which can include particles of iron, and lesser quantities of other suitable metals such as nickel, zinc, chromium, manganese, and the like (e.g., grit from steel sandblasting).

A catalytic metal can be contacted with the biomass by various methods. In one embodiment, the catalyst is added in its metallic form, in the form of small particles. Alternatively, the catalyst can be added in the form of an oxide, hydroxide, or a salt. In another embodiment, a water-soluble salt of the metal is mixed with the biomass and the inert particulate inorganic material in the form of an aqueous slurry. In some embodiments, the biomass and the aqueous solution of the metal salt are mixed before adding the inert particulate inorganic material to facilitate the metal impregnating the biomass. The biomass can also be mixed with the inert particulate inorganic material prior to adding the aqueous solution of the metal salt. In still another embodiment, an aqueous solution of a metal salt is mixed with the inert inorganic material, the material is dried prior to mixing it with the particulated biomass, and the inert inorganic material is thus converted to a heterogeneous catalyst.

In some embodiments, the biomass material is impregnated with a solution of an inorganic material in a suitable solvent, prior to exposing the biomass material to the toasting temperature. Water and aqueous liquids are examples of preferred solvents. Examples of preferred inorganic materials include the carbonates and the hydroxides of alkali metals and earth alkaline metals, in particular the hydroxides and carbonates of sodium and potassium.

In other embodiments, the solid biomass is impregnated with a solution of a soluble inorganic material and intimately mixed with an insoluble, particulate inorganic material, prior to exposing the solid biomass to the toasting temperature. The steps of impregnating the solid biomass with a solution of an inorganic material and of intimately mixing the solid biomass with a particulate inorganic material may be combined, or may be carried out in sequence. Preferred soluble inorganic materials include the hydroxides, carbonates, sulfates of sodium and potassium. Preferred insoluble, particulate inorganic materials include layered anionic and cationic clay materials, transition metal oxides, alkali and alkaline earth oxides, hydroxides, hydroxycarbonates and carbonates, doped transition metal oxides with acidic ions, alumino-silicates, and, in particular, hydrotalcite-like materials and mixtures thereof.

In some embodiments, the biomass is contacted with a pressurized solvent at a temperature above its natural boiling point (e.g., atmospheric pressure). The pressurized solvent is a liquid phase and swell the biomass. Then, the solvent is de-pressurized, causing rapid evaporation of the solvent. The rapid evaporation can be referred as solvent explosion. The solvent explosion can physically rupture the biomass material, thereby making is more accessible to a subsequent reaction.

Examples of solvents that can be used in solvent explosion include ammonia, carbon dioxide, water and the like. If ether is used as the solvent, it can be referred to steam explosion. Steam explosion can be carried before or after demineralization, when combined with demineralization. For example, it may be advantageous to conduct demineralization after steam explosion because steam explosion pretreatment can make the minerals more accessible.

Torrefaction

In some aspects of the invention, the torrefaction process is used as a means to prepare the raw biomass before liquefaction conducted in a catalytic cracking reactor unit by converting soft/flexible raw biomass particles to harder/brittle particles, having higher density, which can be more easily ground to small particles consuming much less mechanical energy; and converting the surface properties of said particles to hydrophobic from hydrophilic. Therefore, the small organophilic (i.e., hydrophobic) particles become more miscible with oil and are suitable to mix with, for example, crude oil FCC-feed and can, this way, be co-processed in the FCC Unit. In some embodiments, the biomass material is subjected to torrefaction to render it more organophilic, i.e., less hydrophilic, and therefore to permit the biomass material to be evenly distributed in the liquid hydrocarbon material, and to be mixed, effectively suspended, or actually suspended in the liquid hydrocarbon material. The torrefaction step enables the biomass material to be physically compatible with, or otherwise efficiently carried by, the liquid hydrocarbon material. In some embodiments, the combination of reducing the particle size of the biomass material to a sufficiently small size and torrefying (described in detail below) the biomass material permits the biomass material to be evenly distributed in the liquid hydrocarbon material, and to be mixed, effectively suspended, or actually suspended in the liquid hydrocarbon material, which may enable the biomass material to be physically compatible with, or otherwise efficiently carried by, the liquid hydrocarbon material.

In an embodiment, the biomass material may be further pretreated, after mechanical processing, in a torrefaction process at a temperature between 80° C. and 400° C., alternatively between 80° C. and 200° C., alternatively between 110° C. and 200° C., alternatively between 200° C. and 400° C. The term "torrefaction" as used herein refers to a heat treatment of the particulated solid biomass material in an oxygen-poor or a substantially oxygen-free atmosphere. The term "toasting" as used herein refers to heat treatment carried out at temperatures between 80° C. and 300° C., or preferably between 110° C. and 200° C., or more preferably between 105° C. and 140° C. The term "roasting" as used herein refers to heat treatment carried out at temperatures between 300° C. and 400° C. Generally, a biomass material is considered "toasted" when it is torrefied at a temperature between 80° C. and 300° C., and a biomass material is considered "roasted" when it is torrefied at a temperature between 300° C. and 400° C.

In some embodiments, the torrefaction process proceeds under atmospheric conditions. Preferably, the torrefaction process proceeds in an oxygen-poor or substantially oxygen-free environment. For example, the torrefaction is carried under an atmosphere containing less oxygen than does ambient air, containing less than about 22 volume percent oxygen, alternatively less than about 20 volume percent oxygen, alternatively less than about 21 volume percent oxygen, alternatively less than about 15 volume percent oxygen, alternatively less than about 10 volume percent oxygen, and alternatively less than about 5 volume percent oxygen. In an embodiment, the torrefaction process proceeds in the presence of an inert gas, such as for example nitrogen or steam.

Under appropriate conditions, for example under toasting conditions, the moisture will escape from the biomass particles and form a steam blanket around the biomass material, thereby protecting it from atmospheric oxygen. The process is then conducted in a steam atmosphere at ambient pressure or at higher steam pressure. However, in some embodiments, the process is carried out in air, as compared to in an atmosphere that is substantially oxygen-free.

In an embodiment, prior to the torrefaction process, the biomass material is mixed with water, and introduced into a closed vessel, for example an autoclave. The amount of water can range from 25 weight percent to 500 weight percent, based on the weight of the dry biomass material. Preferably, the amount of water is in the range of from 50 weight percent to 300 weight percent based on the weight of the dry biomass. As the temperature increases, the atmosphere surrounding the biomass material is enriched in steam, creating an oxygen-poor atmosphere even though no oxygen escapes from the closed vessel. The torrefaction process can then be carried out under autogenous pressure.

In some embodiments, following the torrefaction process, the pressure is released by opening the vessel, or opening a release valve provided on the vessel. In an embodiment, the pressure of the vessel is released while the biomass material remains at an elevated temperature, for example at or about the torrefaction temperature, which, as described, ranges from 80° C. to 400° C. The pressure release causes a rapid evaporation of water absorbed in the biomass material, thereby rupturing the structure of the biomass material and facilitating mechanical processing of the particulated biomass material as well as subsequent conversion reactions.

The biomass material can be torrefied from several seconds to several hours, depending on a number of factors, including without limitation, the initial particle size of the biomass material, the desired particle size of the torrefied biomass material, the initial moisture content of the biomass material, the desired moisture content of the torrefied biomass material, the heating rate, the final desired temperature of the torrefied biomass material, and like considerations. Generally, the duration temperature is short if the temperature is nearer the upper end of the range, particle size is small, and moisture content is low. By way of non-limiting example, the biomass material can be torrefied at 125° C. for about 25 minutes.

As compared to the biomass starting material, the torrefied material offers several advantages. The torrefied material has a higher density, and greater flowability, making it easier to transport and store. Being more brittle, it is more readily ground to smaller particles. Particles obtained by milling or grinding torrefied material are more round (less needle-like) than particles obtained by grinding un-torrefied biomass material. The torrefied material is generally hydrophobic and, as a result, has greater microbial stability.

One skilled in the art would appreciate that as the torrefaction of the biomass material causes it to become relatively brittle, the amount of energy necessary to reduce the mean average particle size of the biomass material is greatly reduced. In some embodiments, relatively large solid biomass particles are used for the torrefaction, for example in the range of 1 cm to 10 cm. In an embodiment, the mean average particle size of the biomass material—as a whole—following the torrefaction process ranges from 1 µm to 1000 µm, alternatively from 10 µm to 500 µm, alternatively from 10 µm to 200 µm ("particulated biomass"). Alternatively, following the torrefaction process the biomass material may be further mechanically processed by, for example, shredding, chipping, milling, grinding, kneading, and the like, until the mean average particle size of the biomass material—as a whole—ranges from 0.1 µm to 1000 µm, alternatively from 1 µm to 500 µm, alternatively from 10 µm to 200 µm. In an alternative embodiment, the biomass material is particulated by conveying biomass material in a stream of gas, and forcing the stream, with the biomass material, to collide with a surface, or with particles, of greater hardness than the biomass material. In an embodiment, such a method may be carried out in a tubular device, or in a cyclone.

During torrefaction, gaseous materials and volatile organic compounds are released from the biomass material. Examples include carbon dioxide, acetaldehyde, formaldehyde, acetic acid, formic acid, methanol, carbon monoxide, and methane. It is desirable to capture these materials as they are released from the biomass. In some embodiments, methane and methanol may be used in the process for heating the biomass to the torrefaction temperature. In some embodiments, carbon monoxide may be used in a subsequent catalytic pyrolysis process as a reducing agent. Acetaldehyde, formaldehyde, acetic acid and formic acid are well known building blocks of valuable organic compounds.

It is generally preferred to avoid producing significant quantities of bio-oil during the torrefaction step. In some embodiments, the torrefaction temperature is chosen so as to avoid the formation of significant quantities of organic compounds that are liquid at room temperature, and contain 4 or more carbon atoms. For example, the torrefaction temperature can be at or above 200° C. In some embodiments, the torrefaction temperature varies with the nature of the biomass material (in particular the amount of ash or minerals present in the biomass material), the presence or absence of catalytic material in the biomass during the torrefaction step, and, if a catalytic material is present, the nature of the catalytic material.

Formation of Fluidizable Particles

In some aspects of the invention, the solid biomass material is converted into a fluidizable biomass/catalyst composite particles. The process comprises the steps of (i) providing a particulated solid biomass material; (ii) forming a composite of the biomass material and a catalytic material; (iii) subjecting the biomass material to a thermal treatment at a torrefaction temperature at or above 200° C., and low enough to avoid significant conversion of the biomass material to liquid conversion products; and (iv) forming fluidizable particles from the biomass material. The term "liquid conversion products" as used herein refers to organic compounds resulting from the conversion of biomass that are liquid at room temperature and contain 4 or more carbon atoms.

In some embodiments the composite of the biomass material and the catalytic material is formed before the biomass material (in this case together with the catalytic material) is subjected to the torrefaction temperature. It will be understood that step (ii) may be carried out immediately prior to step (iii), or there may be one or more intermediate steps, such as drying and/or storing.

The pre-torrefaction biomass material is relatively soft as compared to the catalytic material. As a result, a solid catalytic material readily adheres and/or penetrates the biomass material if mechanical action is exercised on a mixture of the two materials, such as milling, grinding, or kneading.

Mechanical treatment, such as co-milling, co-grinding or co-kneading, is preferred if the catalytic material is insoluble. If the catalytic material is soluble it may be dissolved in a suitable solvent, and the resulting solution used to impregnate the biomass material.

In another embodiment of the invention, the torrefaction step (iii) is carried out before the formation of a composite of the biomass material and a catalytic material (step (ii)), that is, the biomass material is subjected to torrefaction before the composite of the biomass material and the catalytic material is formed. It will be understood that, in this embodiment, step (iii) may be carried out immediately before step (ii), or there may be one or more intermediate steps, such as cooling, grinding, storing, and the like.

As torrefaction makes the biomass material brittle and tends to make the biomass material hydrophobic, which may make it difficult to impregnate the material with a solution of catalytic material, if the solvent is an aqueous liquid. In some embodiments, a slurry or a solution of catalyst material is spared onto particles of torrefied biomass material.

In yet another embodiment, the torrefaction step and the formation of a composite of the biomass material and a catalytic material (steps (ii) and (iii)) are carried out simultaneously. For example, particles of biomass material and catalyst particles may be blended at ambient temperature, and heated together to the torrefaction temperature. Preferably the mixture is subjected to agitation while being heated. In some embodiments, biomass passes through a gelatinous state, in particular if the torrefaction is carried out in a steam atmosphere, or if sufficient water is present in the biomass material to form a steam atmosphere around the particles. Catalyst particles readily adhere to the biomass particles while the latter pass through a gelatinous state.

Some aspects of the invention relates to the fluidization of biomass materials. For processes involving an entrained flow of particles or a fluidized bed of particles, it is desirable to provide particles having a sphere-like shape. The term "sphere-like", as used herein to describe particle shapes, refers to particles having a length-to-diameter ratio of less than 3. Preferred are particles having a length-to-diameter ratio of less than 2. It is being understood that fully spherical particles have a length-to-diameter ratio of 1. The average length-to-diameter ratio of a particulated product can be determined by any technique known in the art. For example, a photomicrograph of a representative sample of the particles may be analyzed using a scanning camera and an appropriate computer algorithm.

In some embodiments, fluidization requires reduction of the particle size of the biomass material. In some embodiments, it may be advantageous to carry out the step of forming fluidizable particles after the torrefaction step because torrefaction improves the grindibility of the biomass material, and the resulting particles are more round (less needle-like) than those obtained by grinding un-torrefied biomass material and smaller, more uniform particles can be obtained with less consumed mechanical energy.

It will be understood that fluidization step does not need to be carried out immediately following torrefaction step, in particular as torrefaction improves the storage properties of the biomass material. The term "fluidizable particles" as used herein refers to Group A particles and Group B particles according to the Geldart classification (see Geldart, Powder Technology 7, 285-292 (1973)). In some embodiments, Group A particles are preferred. In general, these conditions are met if torrefied biomass material is ground to a particle size between 10 μm and 1,000 μm, preferably between 30 μm and 400 μm and more preferably between 2 μm and 40 μm and most preferable less than 1 μm.

Demineralization

In some embodiments, a mineral-containing biomass material is subjected to a demineralization treatment to form the biomass material, either prior to or after the torrefaction process. The purpose of such demineralization treatment is the removal of at least part of the inorganic materials as may be naturally present in the biomass material. Many biomass materials contain minerals that are catalytically active, and could interfere with subsequent conversion processes. Depending on its origin, the solid biomass feedstock may contain from 1 weight percent to more than 20 weight percent minerals, generally referred to as "ash". High ash contents are generally undesirable, as they can lead to uncontrolled catalytic reactions during the conversion process. Minerals present in the biomass material may foul refinery equipment, and may even poison catalysts used in refinery processes. Minerals present in the biomass material can also contribute to the hydrophilic nature of the biomass material, in which case their removal contributes to the organophilizing effect of the torrefaction treatment. In some embodiments, the demineralization treatment removes all, or at least part of, the inorganic materials contained within the biomass material.

In some embodiments, the demineralization treatment includes extraction of minerals from the biomass material with an aqueous solvent. Suitable aqueous solvents can include water or aqueous solutions of an acid such as, for example, and without limitation: a mineral acid including sulfuric acid, nitric acid, and hydrochloric acid, an organic acid including a carboxylic acid such as formic acid, acetic acid, propropionic acid, and the like or mixtures thereof. In an exemplary embodiment, hydrochloric acid is used as it is easily removed from the biomass by heating. Optionally, the aqueous solvent includes a chelant such as, for example and without limitation, citric acid. In some embodiments, the aqueous solvent has a pH of less than about 7, alternatively the aqueous solvent has a pH between 2 to 5.

In some embodiments, the demineralization treatment includes contacting the biomass material with the aqueous solvent, and subsequently removing at least part of the aqueous solvent. In an exemplary embodiment, the demineralization treatment includes swelling the solid biomass material with the aqueous solvent ("swelling"), and subsequently removing at least part of the aqueous solvent by mechanical action ("dewatering"), such as, for example and without limitation, pressing the swollen biomass material in a filter press. In an alternative embodiment, the swelling and dewatering is carried out in a kneader. In various embodiments, the biomass material is swelled and dewatered once, or repeatedly, in order to obtain a biomass material having a suitable mineral content. In an alternative embodiment, the biomass material is swelled and dewatered multiple times, and after the final swelling step, the biomass material—still in its swollen, or substantially swollen, state—may introduced into the torrefaction process.

Suitable mineral contents include less than about 2.5 weight percent minerals, alternatively less than about 1 weight percent minerals, alternatively less than about 0.5 weight percent minerals, based on the total weight of the biomass material. Obtaining biomass with suitable mineral content can be accomplished by a judicious selection of the solid biomass material, or subjecting the biomass material to a demineralization pretreatment, or both.

Agitation of Biomass Particles

In various embodiments, the method includes agitating solid biomass particles, to reduce a size characterizing at least a portion of the particles. See PCT publication WO2010/002792 which is incorporated herein by reference in its entirety. In some embodiments, agitating is facilitated by fluid conveyance, including, without limitation, by gas flow or pneumatic conveyance. Agitating can be conducted in a vertical vessel, such as a riser or downer. An agitator can include a conveyor, a riser, or downer. A riser (up flow) or a downer (down flow) can be, for example, a hollow vertical vessel terminating in a larger diameter vessel, which houses high velocity (e.g., about 60-80 m/s or 18-24 m/s) cyclones that may or may not be physically connected to the riser termination point. The height of a riser or downer can be, for example, between about 15 ft (5 m) and about 60 ft (18 m) and the diameter can be, for example, between about 1 ft (0.3 m) and about 4 ft (1.2 m). Agitating can be facilitated by a gas (e.g., gas can convey the particles such that they are abraded or ground by other particles, catalyst, and/or inorganic particulate material). The gas can be one or more of air, steam, flue gas, carbon dioxide, carbon monoxide, hydrogen, and hydrocarbons (e.g., methane). The gas can be a gas having a reduced level of oxygen (compared to air) or can be substantially oxygen-free. In another embodiment, an agitator is a mill (e.g., ball or hammer mill) or kneader or mixer (e.g., for mechanical, as opposed to pneumatic, agitation).

In certain embodiments, agitating includes causing the solid biomass particles to be conveyed at a velocity of greater than about 1 m/s. For example, the velocity can be measured relative to a vessel in which the particles are conveyed. Agitating includes causing the solid biomass particles to move at a velocity of greater than about 10 m/s. Agitating includes causing at least a portion of the solid biomass particles to move at a velocity of greater than about 100 m/s. An agitator can be adapted to cause the solid biomass particles to move at a velocity of greater than about 1 m/s, greater than about 10 m/s, and/or greater than about 100 m/s. Other velocities include velocities of greater than about 5 m/s, 25 m/s, 50 m/s, 75 m/s, 125 m/s, 150 m/s, 175 m/s, 200 m/s, 225 m/s, or 250 m/s.

For example, the velocity may be within a range selected from the group consisting of 10 m/s to 20 m/s, 20 m/s to 30 m/s, 30 m/s to 40 m/s, 40 m/s to 50 m/s, 50 m/s to 60 m/s, 60 m/s to 70 m/s, 70 m/s to 80 m/s, 80 m/s to 90 m/s, and 90 m/s to 100 m/s. In some embodiments, the velocity can be about 10 m/s, 20 m/s, 30 m/s, 40 m/s, 50 m/s, 60 m/s, 70 m/s, 80 m/s, 90 m/s, or 100 m/s. The velocity can be greater than about 10 m/s, 20 m/s, 30 m/s, 40 m/s, 50 m/s, 60 m/s, 70 m/s, 80 m/s, 90 m/s, or 100 m/s.

In various embodiments, agitating solid biomass particles, to reduce a size characterizing at least a portion of the particles, is facilitated by agitating solid biomass particles together with a material that is harder than the biomass. For example, the material is a catalyst or another inorganic particulate material. The amount of size reduction, and thus the size of the resulting solid biomass particles can be modulated by the duration of agitation and the velocity of agitation. Other factors such as the relative hardness of the catalyst or another inorganic particulate material, the dryness (e.g., brittleness) of the solid biomass particles, and the method/vessel(s) in which agitation occurs also modulate the amount of size reduction.

In embodiments using an abrading or grinding material that is a catalyst, the catalyst can become embedded in the biomass particles and/or the biomass particles can become embedded in the catalyst, which can facilitate catalytic conversion of the biomass. In such embodiments, agitating can facilitate formation of a mechano-chemical interaction between at least a portion of the catalyst and at least a portion of the solid biomass particles, which can facilitate catalytic conversion of the biomass.

Agitation can be carried out at an elevated temperature, for drying the biomass. An elevated temperature can be a temperature sufficient to dry the biomass, for example, between about 50° C. and about 150° C., or below about 200° C. Higher temperatures can be used, for example, where an agitating gas is oxygen-poor or substantially oxygen-free. Agitation can also be carried out at ambient temperature with dried biomass. Drying increases the hardness of the biomass particles, making the particles more susceptible to size reduction.

Agitation can be carried out by various different methods and in various different vessels. For example, in order of increasing abrasion, the agitation can be carried out in a fluid bed, a bubbling or ebullient bed, a spouting bed, or a conveyor. In one embodiment, agitation is carried out by fluid conveyance, including without limitation by gas flow or pneumatic conveyance. In one embodiment, agitation is carried out in a riser or a downer.

Kneader

In some embodiments, the kneader is an extruder, mill, or grinder. For example, the kneader is a screw extruder, or a ball mill or grinder. In some embodiments, a kneader kneads the solid biomass particles and the catalyst, to make at least a portion of the solid biomass particles accessible to at least a portion of the catalyst. The kneader can operate at greater than ambient temperature. For example, the kneader can be heated and/or operate in presence of heated gas (e.g., steam)

In various embodiments, the kneader employs a solvent. The solvent can be water, an alcohol (e.g., ethanol or glycerol), a bio-oil or another product from the conversion of the biomass, a liquid acid, an aqueous acid or base, liquid $CO_2$, and the like. In one embodiment, the solvent is water (e.g., added water and/or water inherent in the biomass), which can be selected for its availability, low cost, and/or ease of handling. In another embodiment, the solvent is a liquid produced during the subsequent conversion of the biomass, which can be selected for its availability. A solvent can improve penetration of a catalyst into biomass because a dry biomass can be more difficult to penetrate. Solvents can be removed (e.g., by drying) prior to subsequent processing and/or conversion. A kneader can remove at least a portion of a solvent absorbed in a biomass (e.g., by mechanical action and draining). Embodiments employing a kneader and a solvent can reduce the ash and/or mineral and/or metal content of the biomass.

In various embodiments, the biomass is kneaded with one or more solid catalyst and/or inorganic particulate material. In some embodiments, the biomass is kneaded with a dissolved and/or suspended catalyst. The dissolved and/or suspended catalyst can be used together with one or more solid catalyst and/or inorganic particulate material. Kneading can be continued and/or repeated to produce a biomass-catalyst mixture having the desired properties (e.g., particle size and/or degree of sensitization).

Suspension

Some aspects of the invention relate to a liquid composition comprising a liquid suspension medium having suspended therein small particles of a biomass material and small particles of an inorganic material, said composition being stable. These liquid compositions are stable in the sense that the solid and liquid phases do not separate within the time necessary to transport them to a location or unit where they can be further processed.

In some embodiments, after the torrefaction process and optionally after the demineralization treatment, the torrefied, particulated biomass material is suspended within a liquid hydrocarbon material. In an embodiment, the torrefied, particulated biomass material is suspended a liquid hydrocarbon material by feeding the torrefied, particulated biomass material and the liquid hydrocarbon material into a high shear mixer.

In an embodiment, the liquid hydrocarbon material may be obtained from a refinery stream. The term "refinery stream" refers herein to any liquid hydrocarbon mixture used as a feedstock in, or produced by, a unit operated in an industrial petroleum refinery. Non-limiting examples of suitable liquid hydrocarbon materials include: naphtha, gasoil, light cycle oil, heavy cycle oil, atmospheric residuum, vacuum residuum, FCC bottoms, aromatic furfural extract, slurry oil, decant oil, de-asphalted oil, crude oil, atmospheric tower bottoms, atmospheric gas oil, vacuum gas oil, light vacuum gas oil, heavy vacuum gas oil, clarified slurry oil, hydrotreated vacuum gas oil, hydrotreated de-asphalted oil, coker gas oil, hydrotreated coker gas oil, and mixtures thereof. One skilled in the art would appreciate that refinery stream can be characterized by their physical properties such as gravity, viscosity, and boiling point. For example, naphtha can be taken as intermediate materials inside a refinery to be eventually blended as finished gasoline. In some embodiments, the hydrocarbon mixture can come directly from crude (e.g. straight run) or after cracking (e.g. FCC, hydrocracking, and coker), reforming, isomerization, and alkylation reactions have taken place. For example, naphtha comprises, for example, molecules having at least 5 carbon atoms (C5) to up to 12 carbon atoms (C12), with a final boiling point around 220° C. In other embodiments, the composition mixture comprises compounds generally having at 8 to 10 carbon atoms (C8 to C10) and extending to 14 carbon atoms (C14) with a final boiling point below 220° C. For example, naphtha is a mixture of four specific families of compounds, paraffins, olefins, naphthenes, and aromatics and may ultimately be composed of more than 400 compounds. Depending on the process used, the formation of one or two of the families of compounds is favored. For example, straight run naphtha can be generally paraffinic in nature and contains no olefins. In some embodiments, the stream can be manipulated in isomerization and reforming units that preferentially make isoparaffins and aromatics, respectively. For example, ATM bottoms are generally an intermediate stream that is sent to the vacuum distillation column. ATM bottoms mixture can be composed of varying degrees of paraffins, aromatics or naphthenes and can be composed of hundreds of compounds having an initial boiling point in excess of 290° C. and a final boiling over 560° C.

As described in detail above, the particulated biomass material is preferably physically compatible with the liquid hydrocarbon material. In an embodiment, the particulated biomass material is suspended in the liquid hydrocarbon material to permit processing of the suspension in a refinery unit operation. The organophilized solid biomass particles is suspended in the liquid hydrocarbon material, such as a refinery stream, by any suitable method. By way of example, organophilized solid biomass particles in the desired particle size range can be fed into a high shear mixer together with a stream of refinery hydrocarbons. Preferably, the suspension is sufficiently stable to permit processing of the suspension in a refinery unit operation. In various embodiments, the suspension is continuously agitated, and in still further embodiments, the residence time of the refinery stream in the refinery unit is very short, for example less than about 5 minutes, alternatively less than about 1 minute, alternatively less than about 30 seconds, alternatively less than about 15 seconds, alternatively less than about 5 seconds, alternatively less than about 1 second. In some embodiments, the particulated biomass material and liquid hydrocarbon suspension contains from 1 weight percent to 40 weight percent, alternatively from 5 weight percent to 25 weight percent, by weight of the suspension, particulated biomass material. In some embodiments, the mean particle size of the particulated solid biomass material in the suspension preferably is in the range of 1 μm to 1000 μm.

In some embodiments, the liquid hydrocarbon material is preheated up to about 400° C. or 500° C., or higher, prior to the introduction of the biomass material into the liquid hydrocarbon material, and then the suspension is fed into a unit. The particulated biomass material present in the suspension can receive additional heat treatment during this preheating step, which results in further organophilization of the biomass material. Without limitation, suitable units includes, for example, a pyrolysis reactor, a fluid catalytic cracking unit, a thermofor catalytic converter, a delayed coker, a fluid coker, a solvent deasphalting unit, a hydroprocessing unit, and a hydrocracking unit. Alternatively, the particulated biomass material is introduced to the liquid hydrocarbon material, without preheating the liquid hydrocarbon material, and the suspension is preheated up to about 400° C. or 500° C., or higher, prior to being fed into the unit. Such heat treatment is carried out at the desired preheating temperature appropriate for the subsequent processing in the refinery unit, or at a lower temperature. In a still further alternative, the particulated biomass material is preheated to a temperature of about 300° C., or less, prior to being introduced to the liquid hydrocarbon material, and then the suspension is preheated to about 400° C. or 500° C., or higher, prior to being fed into the unit.

In some embodiments, the suspension of particulated biomass material and liquid hydrocarbon material is introduced together with a heat carrier within the unit. The heat carrier has a temperature ranging of at least 450° C., preferably at least 550° C., more preferably at least 600° C. In an embodiment, the heat carrier may be an inert material, such as, for example, sand. A material is considered "inert" in this context if it does not catalyze the conversion of solid biomass material to liquid products. Alternatively, the heat carrier is, or otherwise contain, a catalyst.

Catalysts

The term "catalyst" as used herein means any material that catalyzes the conversion of solid biomass material to liquid products. Without limitation, suitable catalysts can have widely varying chemical properties, and preferable catalysts may have specific surface areas (as measured by nitrogen adsorption using the BET method) ranging from 1 $m^2/g$ to 400 $m^2/g$, alternatively from 5 $m^2/g$ to 100 $m^2/g$, alternatively from 5 $m^2/g$ to 50 $m^2/g$. In some embodiments, suitable catalysts include water-insoluble catalysts.

In some embodiments, the catalytic material is an acidic material. Suitable acidic materials include mineral acids, such as nitric acid, hydrochloric acid, phosphoric acid, and sulfuric acid. Solid acidic materials may also be used, such as ZSM-5, HZSM-5, super acids, transition metal oxides (Al, Ti, Zr, etc) doped with acidic ions (salts), such as sulfates, chlorides, phosphates, etc. In some embodiments the catalysts comprise a solid acid, such as, for example, a zeolite including ZSM-5 and zeolite-Y.

In other embodiments, the catalyst may comprise a solid base, such as, for example, a hydrotalcite or a calcinated hydrotalcite, a hydrotalcite-like material or a calcinated hydrotalcite-like material, a clay or a calcinated clay, a layered hydroxy salt or a calcinated layered hydroxy salt, a mixed metal oxide or a calcinated mixed metal oxide, or a mixture thereof. For example, basic catalytic materials include alkali metal oxides and hydroxides, alkali metal carbonates, earth alkaline metal oxides and hydroxides, (in particular, NaOH, KOH, $Na_2CO_3$, and $K_2CO_3$), earth alkaline metal carbonates, layered mixed hydroxides, cationic layered materials, hydrotalcite and hydrotalcite-like materials, combinations of an alkali metal carbonate and a hydrotalcite-like material (including hydrotalcite per se), and mixtures thereof. In some embodiments, calcinated products can be used to reduce the coke yield of the conversion of the suspended biomass material into fuel.

In another embodiment, the catalyst comprises an amphoteric material, such as alumina, or a neutral material (such as coke, for example, petroleum coke). Alternatively, the catalyst may be a conventional FCC catalyst, such as, without limitation, vacuum gas oil (VGO) catalysts, or a catalyst having hydrotreatment activity, or hydrogenation activity, including without limitation Co/Mo, Ni/Mo, Co/W, and Ni/W hydrotreatment catalysts, as well as such catalysts in sulfided form, supported noble metal catalysts, and supported transition metal catalysts (for example iron, zinc, copper, nickel, and manganese).

Conversion of Biomass

Converting biomass feedstocks includes techniques from biomass and/or petroleum processing. In some embodiments, the material may be subjected to a conversion process to form liquid and/or gaseous products. Examples of such processes include pyrolysis, biomass catalytic cracking (e.g., biomass catalytical cracking (BCC), fluid catalytic crackling (FCC type processes adapted from conventional petrochemical processing), hydrothermal upgrading, and gasification.

Some aspects of the invention relate to a catalytic cracking process comprising converting the fluidizable particles made by the present process in a fluidized bed reactor. As catalytic material is already present in the biomass material, it may not be necessary to add additional catalyst. It may be desirable to add a heat carrier material in order to quickly heat the biomass material to the desired conversion temperature. The heat carrier material may be a particulate catalyst material, a particulate inert material, or a mixture of a particulate catalyst material and a particulate inert material as discussed above. In some embodiments, the conversion is carried out at a temperature above the torrefaction temperature of step (iii), and below 550° C. The preferred catalytic conversion temperature is in the range of from 300° C. to 450° C.

Some aspects of the invention relates to the liquid refinery product comprising liquid organic compounds resulting from a conversion of solid biomass material. In some embodiments, the particulated biomass material suspended within the liquid hydrocarbon material may be converted, changed, or otherwise reacted, into fuel within the unit. The conversion, change, or reaction within the unit may be conducted in the presence of molecular hydrogen. In some embodiments, oxygen is removed from the biomass materials by hydrodeoxygenation. In some embodiments, hydrogen is used to efficiently convert oxygen into water. Accordingly, uses of the methods includes transfer of hydrogen from the hydrogen source (e.g., refinery feedstocks, hydrogen gas or a combination thereof) to biomass materials.

In some embodiments, the torrefied and ground biomass material contains an additive/catalyst before being mixed with the FCC-oil feed to be co-processed in the FCC-Unit. Yet in other embodiments, the torrefied and ground biomass material does not contain an additive/catalyst before being mixed with the FCC-oil feed to be co-processed in the FCC-Unit.

Without limitation, the fuel may be used as gasoline, as a feedstock for gasoline blending, as diesel fuel, as a basis for blending a diesel fuel, as jet fuel, as a basis for a jet fuel, as a feedstock for the petrochemical industry, and in connection with other similar uses. These liquid refinery products offer the advantage of a lower carbon footprint, as compared to purely petroleum based refinery liquids, and such fuels may have a higher heating value, as compared to ethanol/gasoline blends, which may result in a variety of benefits, including without limitation, increased gas mileage to the consumer.

In various embodiments, at least one of the first reaction vessel and the second reaction vessel include a riser. At least one of the first and second conventional refinery units can be a fluid catalytic cracking unit, a fluid or delayed coking unit, a fluid catalytic cracking pretreater unit, a resid HT unit, a deasphalting unit, a lube oil HT unit, a hydrocracker, an ethylene polymerization unit, a propylene polymerization unit, or an ebullating bed. The first conventional refinery unit can be a riser.

In certain embodiments, methods, apparatuses, and/or kits include separating at least a portion of the liquefied biomass feedstock into a hydrocarbon fraction for co-processing with the conventional feedstock and an oxygenated fraction. At least a portion of the liquefied biomass feedstock can be de-oxygenated. Oxygen in the processed biomass feedstock can be retained in a product stream, without substantially converting the oxygen to $H_2O$, CO, or $CO_2$. Oxygen in the processed biomass feedstock can be selectively converted to $H_2O$, CO, or $CO_2$ by controlling at least one of catalyst type and reaction temperature.

In various embodiments, methods, apparatuses, and/or kits include a heat exchanger, to heat or cool at least one of the refinery units or recycled catalyst, to modulate a temperature of at least one of the refinery units. A fresh catalyst feed, for adding fresh catalyst after the agitating and the providing steps, can modulate a temperature in at least one refinery unit.

In some embodiments, methods, apparatuses, and/or kits include (i) a third conventional refinery unit, where the first, second, and third units can operate at independently selected temperatures and catalysts, to optimize product selectivity; and (ii) a product separation system, where a product from each unit can be independently separated into one or more of a fraction to be recycled for further processing, a fraction to used as a feedstock for a conventional refinery unit, and a fraction to be used as a specialty chemical.

In various embodiments, the liquefied biomass feedstock is between 1 weight percent and 100 weight percent of the biomass-conventional feedstock. The liquefied biomass feedstock can be between 5 weight percent and 50 weight percent of the biomass-conventional feedstock. The liquefied biomass feedstock can be between 10 weight percent and 20 weight percent of the biomass-conventional feedstock.

In some embodiments, methods, apparatuses, and/or kits include a first conventional refinery unit adapted for liquefying the biomass or the biomass-catalyst mixture to produce a liquefied biomass feedstock. Methods, apparatuses, and/or kits can include retrofitting a preexisting conventional refinery unit for liquefying the biomass or the biomass-catalyst mixture to produce a liquefied biomass feedstock. Methods, apparatuses, and/or kits can also include retrofitting a preexisting second conventional refinery unit for co-processing at least a portion of a liquefied biomass feedstock and a conventional feedstock. Methods, apparatuses, and/or kits can also include integrating the conditioning vessel and the system into the conventional refinery for co-processing the biomass feedstock and the conventional feedstock. Methods, apparatuses, and/or kits can also include providing a first conventional refinery unit adapted for liquefying the biomass or the biomass-catalyst mixture to produce a liquefied biomass feedstock.

In certain embodiments, methods, apparatuses, and/or kits can include instructions. Instructions can be for retrofitting a preexisting first conventional refinery unit for liquefying the biomass-catalyst mixture to produce a liquefied biomass feedstock. Instructions can be for retrofitting a preexisting second conventional refinery unit for co-processing at least a portion of a liquefied biomass feedstock and a conventional feedstock.

In some embodiments, methods of modifying a preexisting catalytic cracking system are provided wherein the preexisting catalytic cracking system has a first riser, a second riser, a first stripper, a second stripper, a knock out drum, and a regenerator. In some embodiments, the method comprises wherein the method comprises modifying the piping and instrumentation of the preexisting catalytic cracking system to accommodate a catalyst cooler; installing a catalyst cooler in the preexisting catalytic cracking system; and modulating the operating parameters of one or more components of the preexisting catalytic cracking system to accommodate biomass material catalytic cracking system.

EXAMPLES

FIGS. 1-4 illustrates exemplary systems for preparing and processing biomass with catalyst.

With reference to FIG. 1 a schematic illustrating an embodiment of various piping and equipment connections of a process for producing fuel from biomass material (described above) is disclosed. In particular, FIG. 1 illustrates a biomass material catalytic cracking system 100 adapted for processing biomass material. In an embodiment, the catalytic cracking system 100 may include at least the following: a first riser 105, a second riser 110, a first stripper 115, a second stripper 120, a knock out drum 125, a regenerator 130, and a catalyst cooler 135 to optimize bio-oil yield. In an embodiment, one or more of the first riser 105, second riser 110, first stripper 115, a second stripper 120, first knock out drum 125, and regenerator 130 may be part of a preexisting catalytic cracking system (not shown). The preexisting catalytic cracking system (not shown) may be retrofitted for processing biomass material by, for example and without limitation: (1) adding the second riser 110; (2) modifying the piping and instrumentation design to accommodate the second riser 110; or (3) modulating the operating parameters of one or more components of the preexisting catalytic cracking system (not shown).

In some embodiments, the first riser 105 is operated under conditions appropriate to deoxygenate and liquefy biomass and the second riser 115 is operated under conditions appropriate to convert a mixture of the biomass and the liquid hydrocarbon into bio fuels. In some embodiments the catalytic cracking system converts the biomass material into fluidizable biomass/catalyst composite particles that can be processed in refinery units or suspended in a refinery feed stream.

Continuing with reference to FIG. 1, the first riser 105 may receive biomass material through a biomass inlet line 140 and a catalyst through a first catalyst line 143. Suitable catalysts are described in detail above. The first riser 105 may also receive a gas (for example, steam, flue gas, and/or wet gas) through a first gas line 146, which may heat in part the first riser 105. In an embodiment, the biomass inlet line 140, the first catalyst line 143, and the first gas line 146 may each be directly connected to the first riser 105. Alternatively, the biomass inlet line 140, the first catalyst line 143, and the first gas line 146 may each be directly connected to a first riser feed line 149, and the first riser feed line 149 may be directly connected to the first riser 105. In an embodiment, the first riser 105 may de-water and/or de-oxygenate the biomass material. In various embodiments, the first riser 105 may be operated at about 105° C. if it is used for dewatering and particle size reduction, or at about 350° C. if it is used for deoxygenation.

In some embodiments, the first gas line 146 may agitate the biomass material and the catalyst, providing a velocity to at least a portion of the biomass material sufficient to reduce the particle size of at least some of the biomass material. For example, the resulting biomass material may have an average particle size ranging from about 1 μm to about 1000 μm, and individual particle sizes of the biomass material may range from about 1 μm to about 1500 μm, alternatively from about 200 μm to about 500 μm.

In various embodiments, and without wishing to be bound by the theory, the first riser 105 may be operated at relatively low temperature, which may facilitate conversion and product selectivity of the biomass material to liquefied biomass feedstock. In an exemplary embodiment, the first riser 105 is operated at relatively low temperatures to effect selective liquefaction (or thermolysis) of cellulose and hemicellulose which depolymerize at lower temperatures. At higher temperatures and long residence time (i.e. higher severities), the cracking of cellulose and hemicellulose will lead to gas production ($CO$, $CO_2$, $H_2O$, $H_2$) and light hydrocarbons, lowering liquefaction yields. In some embodiments, the first riser 105 is operated at temperatures below about 350° C. One skilled in the art would appreciate that the temperature range of the first riser is dependent on the biomass pretreatment and catalyst protocol used.

The product vapors, residual biomass solids and catalyst solids may exit the first riser 105 and enter the first stripper 115 through a first stripper feed line 152. The first stripper 115 may fluidize the catalyst and residual biomass solids and strip hydrocarbons between particles of solids and from the surface of the solids. In an embodiment, steam (not shown) may be fed into the first stripper 115 through a steam feed line (not shown) to facilitate fluidization of the catalyst residual biomass solids and/or stripping of hydrocarbons from the surface from their surfaces.

The stripped product vapors and steam may exit the first stripper 115 and enter the knock out drum 125 through a first knock out drum feed line 155. In an embodiment, the knock out drum 125 may cool and liquefy at least a portion of the gas fraction, which may allow the aqueous phase and the hydrophobic to separate. In an embodiment, condensable vapors may be removed through a knock out drum exit line 158. The spent catalyst may be fed through a first regenerator feed line 161 into the regenerator 130. The product gases and steam from the second stripper 120 may be fed through line 164 into the knock out drum 125. Within the knock out drum 125, the hydrophobic phase may be separated as a liquid product (e.g., fuels, specialty chemicals, other intermediates) from the aqueous phase. Non-condensable vapors exit the knock out drum 125 through line 167 and include, but not limited to, light gas, liquefied petroleum gas, as well as oxygenated gases (such as for example $H_2O$, $CO$, $CO_2$). Non-condensable gases may be separated and used, stored, sold, or recycled. In some embodiments, the oxygenated gases may be used to facilitate algae growth, which—without wishing to be bound by the theory—may have the benefit of reducing greenhouse gas/carbon emissions.

In an embodiment, spent catalyst and residual biomass separated in first stripper 115 may exit the first stripper and enter the second riser 110 through a first stripper exit line 170. Conventional feedstock, (described above) may additionally be fed into the second riser 110 through a second riser feed line 173. In this manner and in an embodiment, the second riser 110 may co-process the liquefied biomass feedstock and the conventional feedstock.

In an exemplary embodiment, the biomass material is pretreated such that it may be suspended in a liquid hydrocarbon material upon its introduction into the second riser 110. The second riser 110 may additionally receive, and be heated by, hot catalyst from regenerator 130 through line 182. The second riser 110 may additionally receive lift gas (e.g., steam, flue gas, wet gas). In a non-limiting embodiment, the second riser 110 may be operated at temperatures above about 400° C. One skilled in the art would appreciate that by operating the second riser 110 at temperatures or severities higher than the first riser 105, the lignin component of the biomass and/or the depolymerization intermediates can be effectively converted into liquids. In various embodiments, the second riser 110 may be operated in essentially the same manner as a conventional reactor (i.e., a reactor designed for processing conventional feedstock, not liquefied biomass feedstock).

In various embodiments, the residual biomass feedstock fed into the second riser 110 through the first stripper exit line 170 may be between 1 weight percent and 100 weight percent, alternatively between 5 weight percent and 50 weight percent, alternatively between 10 weight percent and 20 weight percent, of the biomass-conventional feedstock used during co-processing.

The products and spent catalyst from the top of the second riser 110 may be fed into the second stripper 120 through a second stripper inlet line 176. In an embodiment, stripping in the second stripper 120 may be facilitated by steam. The product vapors leaving stripper 120 may include hydrocarbons, stripped from the surface of the catalyst, and steam. In an embodiment, the operating parameters of the first stripper 115 and the second stripper 120 may be the same, or independently chosen. In some embodiments, the riser and strippers run under adiabatic conditions. In some embodiments the strippers, 115 and 120 may be operated within the operating parameters of a conventional catalytic cracking system (for example between about 450° C. and about 550° C.). In a non-limiting embodiment, the strippers 115 and 120 may be operated at similar or lower temperatures than the risers. For example, the strippers may be operated at temperatures of about 10° C. to about 50° C. lower than the risers.

As described above, the regenerator 130 may receive spent catalyst from the second stripper 120 through the regenerator feed line 161. Preferably, the catalyst is regenerated in the regenerator 130. In some embodiments, the second stripper 120 may increase product yield, decrease coke, decrease flue gas, and decrease the necessary regenerator temperature because it decreases the amount of hydrocarbons that enter, and are thus burned in, the regenerator 130. The regenerator 130 may produce flue gas, and may be used in other portions of the system.

The hot regenerated catalyst may be fed from the regenerator 130 into the catalyst cooler 135 through a catalyst cooler feed line 185. In an embodiment, the catalyst cooler 135 cools the catalyst. The cooled catalyst may be reintroduced into the first riser 105 through the first riser feed line 149.

Figure 2:
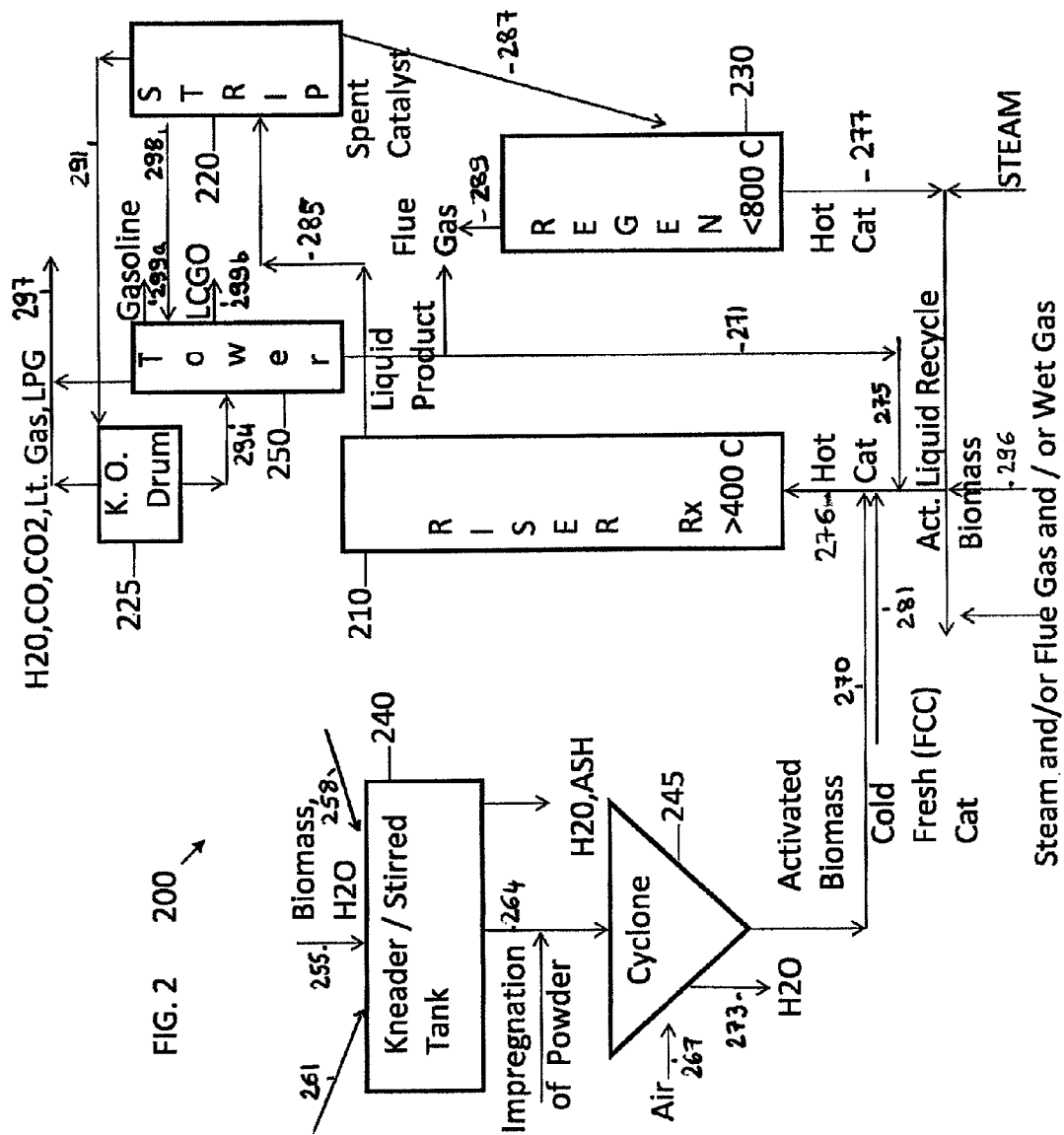
FIG. 2 illustrates an exemplary embodiment of piping and equipment design including a kneader, a cyclone, a riser, a catalyst cooler, a stripper, a regenerator and a knock out drum.

FIG. 2 illustrates a second catalytic cracking system 200 adapted for processing biomass materials. The second catalytic cracking system 200 may include at least the following: a riser 210, a stripper 220, a knock out drum 225, a regenerator 230, a kneader 240, a cyclone 245, and a tower 250. In an embodiment, one or more of the riser 210, stripper 220, knock out drum 225, a regenerator 230 can be part of a preexisting catalytic cracking system (not shown). The preexisting catalytic cracking system (not shown) may be retrofitted for processing biomass material by, for example and without limitation: (1) adding the kneader 240, cyclone 245, and tower 250; (2) modifying the piping and instrumentation design to accommodate the kneader 240, cyclone 245, and tower 250; or (3) modulating the operating parameters of one or more components of the preexisting catalytic cracking system (not shown).

Continuing with reference to FIG. 2, the kneader 240 may receive the biomass material through a first kneader feed line 255. In an embodiment, the biomass material may be kneaded within the kneader 240. The kneader may also receive a solvent (for example and without limitation, water or ethanol) through a second kneader feed line 258. The solvent may facilitate removal of impurities, such as ash, minerals, and metals, from the biomass material. At least a portion of the solvent, and/or other liquid intrinsic to unprocessed biomass material, may be removed from the biomass material in the kneader 240. The kneader 240, may additionally receive a catalyst through a third kneader feed line 261. In an embodiment, the kneader 240 may knead the biomass material such that at least a portion of the biomass material is accessible to at least a portion of the catalyst. In this manner, the kneader 240 may produce biomass material "activated" for catalytic conversion ("activated biomass material"). In some embodiments, the kneader 240 may reduce the particle size of the biomass material.

Kneaded, or activated, biomass material may be fed from the kneader 240 through a cyclone feed line 264 into cyclone 245. The kneaded, or activated, biomass material may be agitated by gas, such as for example air, fed into the cyclone 245 through a cyclone air feed line 267. In an embodiment, the agitation may further reduce the particle size of the biomass material. In an embodiment, the cyclone 245 may dry the activated biomass material, thereby removing water and solvent through a cyclone drain line 273. Within the cyclone 245, the biomass material may be dried by either heating the biomass material with a hot gas, such as air fed into the cyclone 245 through a cyclone air feed line 267, or mechanical action. In various embodiments, the particle size of the biomass material may be reduced to a size sufficient to be dissolved or suspended in a liquid feedstock (described above) and introduced directly into the second riser 210 through a second riser feed line 270. In an alternative embodiment (not shown), the biomass material are fed into a kneader after receiving cyclonic treatment.

The riser 210 may receive biomass material, and optionally activated biomass material, from the cyclone 245 through the riser inlet line 270. In an embodiment, the individual activated biomass material have sizes small enough that the activated biomass material flows, and can be gravity-fed into the riser 210. In an embodiment, the biomass material may have an average particle size ranging from about 250 μm to about 1000 μm, and individual particle sizes of the biomass material may range from about 1 μm to about 1500 μm, alternatively from about 200 μm to about 500 μm, upon its introduction into the riser 210. In an exemplary embodiment, the riser 210 also receives a liquid hydrocarbon material such as conventional feedstock through a riser feed line 275. Thus, the riser 210 may co-process the activated biomass material feedstock and the liquid hydrocarbon material. In an embodiment, the biomass material is pretreated such that it may be suspended in a liquid hydrocarbon material upon its introduction into the riser 210. Furthermore, the riser 210 may receive, and further process, a liquid fraction recycled from the tower 250 from a liquid fraction feed line 271. The liquid fraction may be recycled from the tower 250 through feed line 271 which may be attached to riser feed line 275.

Riser 210 may receive and be heated by, hot catalyst from the regenerator 230 though a riser hot catalyst feed line 276. Riser 210 may additionally receive, and be heated by, a hot gas such as steam, non-condensable product gas or flue gas, through a riser hot gas feed line 296. Riser 210 may receive, and be cooled by, relatively cold, fresh catalyst through a riser cold catalyst feed line 281. In various non-limiting embodiments, riser 210 may operate at temperatures above about 400° C., alternatively between 450° C. and 550° C. In an embodiment, and without wishing to be limited by the theory, riser 210 may be operated essentially as a conventional reactor.

Stripper 220 may receive product vapors and spent catalyst from the riser 210 through a stripper feed line 285. Stripper 220 may fluidize the catalyst and strip hydrocarbons between particles of the catalysts and from the surface of the catalyst. In an embodiment, steam (not shown) may be fed into the stripper through a steam feed line (not shown) to facilitate fluidization of the catalyst and/or stripping of hydrocarbons from the surface of the catalyst.

The spent catalyst may be fed through a regenerator feed line 287 into the regenerator 230. The stripped product vapors and steam may exit the stripper 220 and enter knock out drum 225 through knock out drum feed line 291.

In an embodiment, knock out drum 225 may cool and liquefy at least a portion of the gas fraction of the stripped catalyst and biomass material, which may allow the aqueous phase and the hydrophobic to separate. In an embodiment, the aqueous phase (e.g., water), as well as gas and/or liquid fraction, may be fed into the tower 250 through knock out drum exit line 294. The incondensable vapors separate within knock out drum 225 and may be removed as desirable, unliquefied, products, including but not limited to light gas, liquefied petroleum gas, as well as oxygenated gases (such as for example $H_2O$, $CO$, $CO_2$), through knock out drum product line 297. The desirable, unliquefied products, may be separated and used, stored, sold, or recycled. In some embodiments, the oxygenated gases may be used to facilitate algae growth, which may have the benefit of reducing greenhouse gas/carbon emissions.

In an embodiment, a condensable fraction, of liquefied biomass feedstock, from the stripper 220 may be fed into the tower 250 through a tower feed line 298. The tower 250 may separate the condensable fraction of liquefied biomass feedstock into fractions. For example, the tower 250 may separate the condensable fraction of liquefied biomass feedstock into gasoline, light cycle gas oil (LCGO), other liquid products (e.g., fuels, specialty chemicals), gas products (e.g., light gas, LPG), other gases (e.g., $H_2O$, $CO$, $CO_2$), which may exit the tower 250 as product through tower product lines 299a, 299b. Further, the tower 250 may separate the condensable fraction of liquefied biomass feedstock into hydrocarbon compounds requiring further processing, which may be recycled into riser 210 through the liquid fraction feed line 271. The tower may function as the main column of a conventional FCC unit. In various alternative embodiments, the gaseous products from knock out drum 225 may be combined with the overhead light gas stream from the tower 250 and be sent to a conventional light gas separation section (not shown). In still further embodiments, $CO_2$ may be recovered (and possibly added to a $CO_2$ rich stream from the second regenerator flue gas) and recycled to a bioreactor (not shown) to increase the growth of biomass feedstock.

As described above, the regenerator 230 may receive spent catalyst from stripper 220 through the regenerator feed line 287. Preferably, the catalyst is regenerated in the regenerator 230. The regenerator 230 may produce flue gas, which may exit through a second regenerator flue gas exit line 289, and may be used in other portions of the system 200 (such as in riser 210). The hot regenerated catalyst may be fed from the regenerator 230 into riser 210 through a regenerated riser hot catalyst feed line 277.

Figure 3:
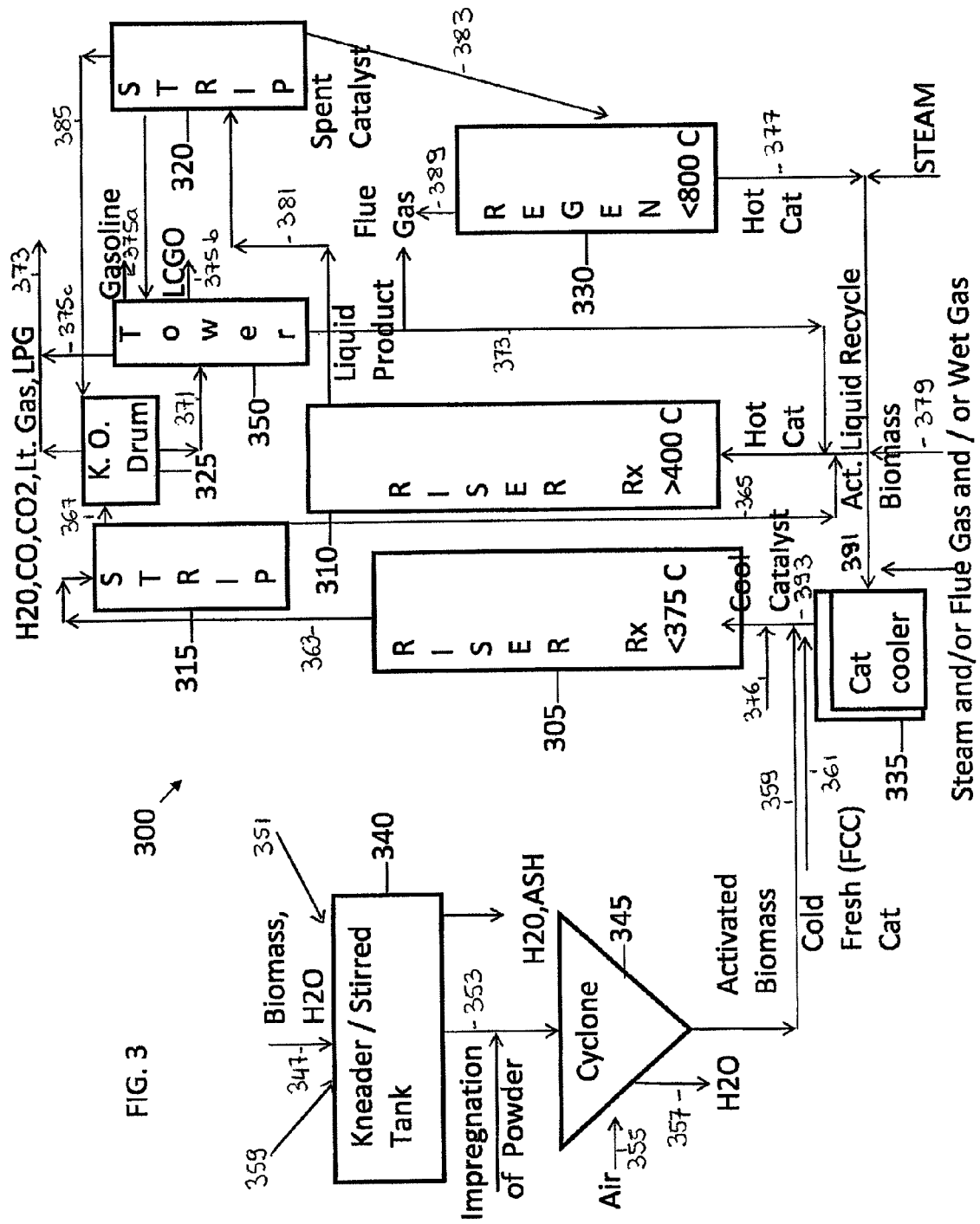
FIG. 3 illustrates an exemplary embodiment of piping and equipment design including a kneader, a cyclone, two risers, a catalyst cooler, two strippers, one regenerator and a knock out drum.

With reference to FIG. 3 a schematic illustrating an embodiment of various piping and equipment connections of a process for producing fuel from biomass material (described above) is disclosed. In particular, FIG. 3 illustrates a third catalytic cracking system 300 adapted for processing biomass material. In an embodiment, the third catalytic cracking system 300 may include at least the following: a first riser 305, a second riser 310, a first stripper 315, a second stripper 320, a knock out drum 325, a regenerator 330, a catalyst cooler 335, a kneader 340, a cyclone 345, and a tower 350. In an embodiment, one or more of the first riser 305, the second riser 310, the first stripper 315, the second stripper 320, knock out drum 325, and the regenerator 330 may be part of a preexisting catalytic cracking system (not shown). The preexisting catalytic cracking system (not shown) may be retrofitted for processing solid biomass particles by, for example and without limitation: (1) adding the catalyst cooler 335, the kneader 340, the cyclone 345, and the tower 350; (2) modifying the piping and instrumentation design to accommodate the catalyst cooler 335, the kneader 340, the cyclone 345, and the tower 350; and (3) modulating the operating parameters of one or more components of the preexisting catalytic cracking system (not shown).

Continuing with reference to FIG. 3, the kneader 340 may receive the biomass material through a kneader inlet line 347. In an embodiment, the biomass material may be kneaded within the kneader 340. The kneader 340 may also receive a solvent (for example and without limitation, water or ethanol) through a kneader solvent inlet line 359. The solvent may facilitate removal of impurities, such as ash, minerals, and metals, from the biomass material. At least a portion of the solvent, and/or other liquid intrinsic to unprocessed biomass material, may be removed from the biomass material in the kneader 340. The kneader 340, may additionally receive a catalyst through a kneader catalyst inlet line 351. In an embodiment, the kneader 340 may knead the biomass material such that at least a portion of the biomass material is accessible to at least a portion of the catalyst. In this manner, the kneader 340 may produce biomass material "activated" for catalytic conversion ("activated biomass material"). In some embodiments, the kneader 340 may reduce the particle size of the biomass material.

Kneaded, or activated, biomass material may be fed from the kneader 340 through a cyclone feed line 353 into the cyclone 345. The kneaded, or activated, biomass material may be agitated by gas, such as for example air, fed into the cyclone 345 through a cyclone air feed line 355. In an embodiment, the agitation may further reduce the particle size of the biomass material. In an embodiment, the cyclone 345 may dry the activated biomass material, thereby removing water and solvent through a cyclone drain line 357. Within the cyclone 345, the biomass material may be dried by either heating the biomass material with a hot gas, such as air fed into the cyclone 345 through a cyclone air feed line 355, or mechanical action. In various embodiments, the particle size of the biomass material may be reduced to a size sufficient to be dissolved or suspended in a liquid feedstock (described above) and introduced directly into the first riser 305 through a riser feed line 359. In an alternative embodiment (not shown), the biomass material may be fed into a kneader after receiving cyclonic treatment.

The first riser 305 may receive biomass material, and optionally activated biomass material, from the cyclone 345 through the riser inlet line 359. In an embodiment, the individual activated biomass material have sizes small enough that the activated biomass fluidizes, and can be pneumatically transported or gravity-fed into the first riser 305. In an embodiment, the biomass material may have an average particle size ranging from 250 μm to 1000 μm and individual particle sizes of the biomass material may range from 1 μm to 1500 μm, alternatively from 200 μm to 500 μm, upon its introduction into the first riser 305. The first riser 305 may also receive a liquid hydrocarbon material such as for example, a conventional feedstock through a feed line 376. Thus, the first riser 305 may co-process the activated biomass material feedstock and the liquid hydrocarbon material. In an embodiment, the biomass material is pretreated such that it may be suspended in a liquid hydrocarbon material upon its introduction into the first riser 305.

In an embodiment, the first riser 305 may receive, and be cooled by, relatively cold, fresh catalyst through a first riser cold catalyst feed line 361. In various non-limiting embodiments, the first riser 305 may operate at a temperatures less than 375° C., alternatively between about 250° C. and 350° C. In an embodiment, and without wishing to be limited by the theory, the first riser 305 may be operated essentially as a conventional reactor. In an embodiment, the first riser 305 may be used primarily for deoxygenation.

The first stripper 315 may receive product vapors, residual biomass and spent catalyst solids from the first riser 305 through a first stripper feed line 363. The first stripper 315 may fluidize the catalyst and strip hydrocarbons between particles of catalysts and residual biomass and from their surfaces. In an embodiment, steam (not shown) may be fed into the stripper 315 through a steam feed line (not shown) to facilitate fluidization of the catalyst and/or stripping of hydrocarbons from the surface of the catalyst.

Within the first stripper 315, residual biomass and spent catalyst may be separated from a product vapors. The solids of the first stripper 315 may enter the second riser 310 through a second riser feed line 365. The gas fraction from the first stripper 315 may enter knock out drum 325 through a knock out drum inlet line 367.

In an embodiment, the knock out drum 325 may cool and liquefy at least a portion of the gas fraction of the stripped catalyst and biomass material, which may allow the aqueous phase and the hydrophobic to separate. In an embodiment, the hydrocarbon phase may be fed into the tower 350 through a knock out drum exit line 371. Non-condensable gases exit the knock out drum through line 373. The desirable, non-condensable products, may be separated and used, stored, sold, or recycled. In some embodiments, the oxygenated gases may be used to facilitate algae growth, which may have the benefit of reducing greenhouse gas/carbon emissions.

The tower 350 may separate the condensable fraction of liquefied biomass feedstock into fractions. For example, the tower 350 may separate the condensable fraction of liquefied biomass feedstock into gasoline, light cycle gas oil (LCGO), other liquid products (e.g., fuels, specialty chemicals), which may exit the tower 350 as products through tower product lines 375a, 375b. 375c. Further, the tower 350 may separate the condensable fraction of liquefied biomass feedstock into hydrocarbon compounds requiring further processing, which may be recycled into the second riser 310 through a liquid fraction feed line 373. The tower may function as the main column of a conventional FCC unit. In various alternative embodiments, the gaseous products from the knock out drum 325 may be combined with the overhead light gas stream from the tower 350 and be sent to a conventional light gas separation section (not shown). In still further embodiments, $CO_2$ may be recovered (and possibly added to a $CO_2$ rich stream from the regenerator flue gas) and recycled to a bioreactor (not shown) to increase the growth of biomass feedstock.

In an embodiment, a condensable fraction of liquefied biomass feedstock, from the tower 350 may be fed into the second riser 310 through the liquid fraction feed line 373. The second riser 310 may also receive, and be heated by, hot catalyst from the regenerator 330 though a second riser hot catalyst feed line 377. The second riser 310 may additionally receive, and be heated by, a hot gas such as steam, or non-condensable product or flue gas, through a second riser hot gas feed line 379.

The liquid and/or gaseous product and spent catalyst from the top of the second riser 310 may be fed into the second stripper 320 through a second stripper inlet line 381. The spent catalyst may be fed through a regenerator feed line 383 into the regenerator 330. Product vapors and steam may exit the second stripper 320, and enter the knock out drum 325 through a knock out drum feed line 385.

As described above, the regenerator 330 may receive spent catalyst from the second stripper 320 through the regenerator feed line 383. Preferably, the catalyst is regenerated in the regenerator 330. The regenerator 330 may produce flue gas, which may exit through a regenerator flue gas exit line 389, and may be used in other portions of the system 300 (such as the first riser 305 or second riser 310).

The hot regenerated catalyst may be fed from the regenerator 330 into the catalyst cooler 335 through a catalyst cooler feed line 391. The catalyst may be cooled within the catalyst cooler 335. The cooled catalyst may be fed from the catalyst cooler 335 into the first riser 305 through a cooled catalyst first riser feed line 393.

Figure 4:
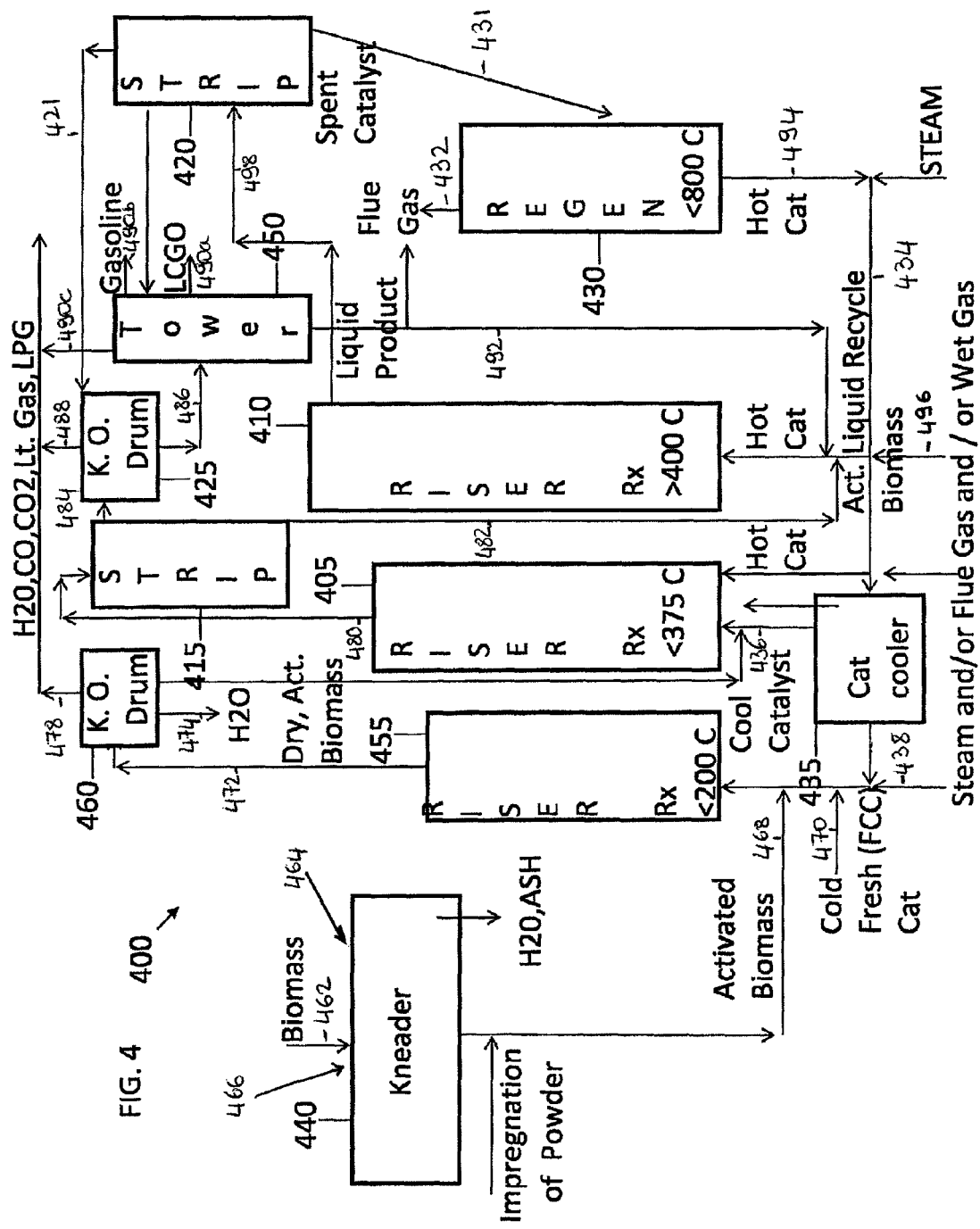
FIG. 4 illustrates an exemplary embodiment of piping and equipment design including a kneader, three risers, two strippers, one regenerator and two knock out drums.

With reference to FIG. 4 a schematic illustrating an embodiment of various piping and equipment connections of a process for producing fuel from biomass material (described above) is disclosed. In particular, FIG. 4 illustrates a fourth catalytic cracking system 400 adapted for processing biomass material. In an embodiment, the fourth catalytic cracking system 400 may include at least the following: a first riser 405, an second riser 410, a third riser 455, a first stripper 415, a second stripper 420, a first knock out drum 460, a second knock out drum 425, a regenerator 430, a catalyst cooler 435, a kneader 440, and a tower 450. In an embodiment, one or more of the first riser 405, the second riser 410, the first stripper 415, the second stripper 420, the first knock out drum 460, the second knock our drum 425, and the regenerator 430 may be part of a preexisting catalytic cracking system (not shown). The preexisting catalytic cracking system (not shown) may be retrofitted for processing solid biomass particles by, for example and without limitation: (1) adding the kneader 440, the tower 450, and the third riser 455; (2) modifying the piping and instrumentation design to accommodate the kneader 440, the tower 450, and the third riser 455; and (3) modulating the operating parameters of one or more components of the preexisting catalytic cracking system (not shown).

In various non-limiting embodiments, the third riser 455 may operate at a temperatures below about 200° C., alternatively between about 150° C. and 200° C. In an embodiment, and without wishing to be limited by the theory, the third riser 455 may be operated to dry the biomass material at temperatures below the conversion temperature of the biomass material. In an embodiment, the third riser 455 may be used for particle size reduction and dewatering.

Continuing with reference to FIG. 4, the kneader 440 may receive the biomass material through a kneader inlet line 462. In an embodiment, the biomass material may be kneaded within the kneader 440. The kneader 440 may also receive a solvent (for example and without limitation, water or ethanol) through a kneader solvent inlet line 464. The solvent may facilitate removal of impurities, such as ash, minerals, and metals, from the biomass material. At least a portion of the solvent, and/or other liquid intrinsic to unprocessed biomass material, may be removed from the biomass material in the kneader 440. The kneader 440, may additionally receive a catalyst through a kneader catalyst inlet line 466. In an embodiment, the kneader 440 may knead the biomass material such that at least a portion of the biomass material is accessible to at least a portion of the catalyst. In this manner, the kneader 440 may produce biomass material "activated" for catalytic conversion ("activated biomass material"). In some embodiments, the kneader 440 may reduce the particle size of the biomass material.

Kneaded, or activated, biomass material may be fed from the kneader 440 into the third riser 455 through the riser inlet line 468. In an embodiment, the individual activated biomass material have sizes small enough that the activated biomass material flows, and can be gravity-fed into third riser 455. In an embodiment, the biomass material may have an average particle size ranging from 250 μm to 1000 μm, alternatively from 200 μm to 500 μm, and individual particle sizes of the biomass material may range from 1 μm to 1500 μm, alternatively from 200 μm to 500 μm, upon its introduction into riser 455. In an embodiment, third riser 455 may receive, and be cooled by, relatively cold, fresh catalyst through a riser cold catalyst feed line 470.

In some embodiments, vapors released for the dried, activated biomass material may be fed from the third riser 455 into the first knock out drum 460 through a first knock out drum feed line 472. First knock out drum 460 may cool and liquefy at least a portion of the gas fraction, which may allow the aqueous phase and the hydrophobic to separate. In an embodiment, the aqueous phase (e.g., water) may be drained from the first knock out drum 460 through a water drain line 474. In an embodiment gas and/or liquid fraction, may be fed from the first knock out drum 460 into product separation section through line 478. The first riser 405 may receive dried biomass material, and optionally dried activated biomass material, from third riser 455. In an embodiment, the individual activated biomass material have sizes small enough that the activated biomass material flows, or can be fluidized, and can be gravity-fed or pneumatically transported into first riser 405. First riser 405 may also receive conventional feedstock through a feed line (not shown). Thus, the first riser 405 may co-process the activated biomass material feedstock and the conventional feedstock. In various non-limiting embodiments, the first riser 405 may operate at a temperature less than about 375° C., alternatively between about 250° C. and about 350° C. In an embodiment, and without wishing to be limited by the theory, the first riser 405 may be operated essentially as a conventional reactor.

The first stripper 415 may receive vapors, residual biomass and spent catalyst solids from first riser 405 through a first stripper feed line 480. The first stripper 415 may fluidize the catalyst and residual biomass and strip hydrocarbons between particles of the catalysts and residual biomass and from their surfaces. In an embodiment, steam (not shown) may be fed into the fourth stripper through a steam feed line (not shown) to facilitate fluidization of the catalyst and/or stripping of hydrocarbons from the surface of the catalyst.

Within the first stripper 415, unconverted or partially converted biomass and spent catalyst may be separated from product vapor fraction. The solids of the first stripper 415 may enter the second riser 410 through an second riser feed line 482. The gas fraction from the first stripper 415 may enter the second knock out drum 425 through a knock out drum inlet line 484.

In an embodiment, the second knock out drum 425 may cool and liquefy at least a portion of the gas fraction of the stripped catalyst and biomass material, which may allow the aqueous phase and the hydrophobic to separate. In an embodiment, hydrophobic liquid fraction, may be fed into the tower 450 through a knock out drum exit line 486. Non-condensable products, including but not limited to light gas, liquefied petroleum gas, as well as oxygenated gases (such as for example $H_2O$, $CO$, $CO_2$), through a knock out drum product line 488. The desirable, non-condensable products, may be separated and used, stored, sold, or recycled. In some embodiments, the oxygenated gases may be used to facilitate algae growth, which may have the benefit of reducing greenhouse gas/carbon emissions.

The tower 450 may separate the condensable fraction of liquefied biomass feedstock into fractions. For example, the tower 450 may separate the fluidized fraction, or liquefied biomass feedstock into gasoline, light cycle gas oil (LCGO), other liquid products (e.g., fuels, specialty chemicals), which may exit the tower 450 as product through tower product lines 490a, 490b, 490c. Further, the tower 450 may separate condensable fraction of liquefied biomass feedstock into hydrocarbon compounds requiring further processing, which may be recycled into the second riser 410 through a tower liquid fraction feed line 492. The tower may function as the main column of a conventional FCC unit. In various alternative embodiments, the gaseous products from the second knock out drum 425 may be combined with the overhead light gas stream from the first knock out drum 460, and optionally the tower 450, and be sent to a conventional light gas separation section (not shown). In still further embodiments, $CO_2$ may be recovered (and possibly added to a $CO_2$ rich stream from the third regenerator flue gas) and recycled to a bioreactor (not shown) to increase the growth of biomass feedstock.

In an embodiment, a condensable fraction of liquefied biomass feedstock, from the tower 450 may be fed into the second riser 410 through the tower liquid fraction feed line 492. The second riser 410 may also receive, and be heated by, hot catalyst from the regenerator 430 though riser hot catalyst feed line 494. The second riser 410 may additionally receive, and be heated by, a hot gas such as steam, or non-condensable product or flue gas, through an second riser hot gas feed line 496.

The liquid and/or gaseous product and spent catalyst from the top of the second riser 410 may be fed to a second stripper 420 through a second stripper inlet line 498. The spent catalyst may be fed through a regenerator feed line 431 into the regenerator 430. The product vapors and stripping steam may exit the second stripper 420 in a gas and/or a liquid fraction, and enter the second knock out drum 425 through a second knock out drum feed line 421.

As described above, the regenerator 430 may receive spent catalyst from the second stripper 420 through the regenerator feed line 431. Preferably, the catalyst is regenerated in the regenerator 430. The regenerator 430 may produce flue gas, which may exit through a regenerator flue gas exit line 432, and may be used in other portions of the system 400 (such as the first riser 405 or second riser 410).

The hot regenerated catalyst may be fed from the regenerator 430 into the catalyst cooler 435 through a catalyst cooler feed line 434. The catalyst may be cooled within the catalyst cooler 435. The cooled catalyst may be fed from the catalyst cooler 435 into the first riser 405 through a cooled catalyst riser feed line 436. Alternatively, the cooled catalyst may be fed from the catalyst cooler 435 into the riser cold catalyst feed line 470 through a cold catalyst mixing line 438, and then fed into the third riser 455.

The present invention provides among other things methods for converting biomass into fuel and chemicals. While specific embodiments of the subject invention have been discussed, the above specification is illustrative and not restrictive. Many variations of the invention will be come apparent to those skilled in the art upon review of this specification. The full scope of the invention should be determined by reference to the claims, along with their full scope of equivalents, and the specification, along with such variations.

The invention claimed is:

1. A process for producing fuel from biomass comprising:
   (i) torrefying biomass material at a temperature between 80° C. and 400° C. under conditions wherein biomass conversion is avoided to form particulated biomass having a mean average particle size from 1 μm to 1000 μm;
   (ii) mixing the particulated biomass with a liquid hydrocarbon to form a stable suspension of particulated biomass within the liquid hydrocarbon, wherein the suspension comprises between 1 weight percent and 40 weight percent particulated biomass;
   (iii) contacting the suspension with a heat-carrier material, wherein the heat carrier material comprises a catalyst, the catalyst being selected from the group consisting of a cobalt molybdate, a nickel molybdate, and a tungstate hydroprocessing catalyst;
   (iv) feeding the suspension into a unit selected from the group consisting of a pyrolysis reactor, a fluid catalytic cracking unit, a delayed coker, a fluid coker, a hydroprocessing unit, and a hydrocracking unit; and
   (v) converting at least a portion of the particulated biomass of the suspension into fuel.

2. The process of claim 1, wherein the step of torrefying the biomass material is performed at a temperature between 80° C. and 200° C.

3. The process of claim 1, wherein the step of torrefying the biomass material is performed at a temperature between 110° C. and 400° C.

4. The process of claim 1, wherein the suspension of particulated biomass within the liquid hydrocarbon comprises between 5 weight percent and 25 weight percent particulated biomass.

5. The process of claim 1, further comprising: heating the suspension of particulated biomass within the liquid hydrocarbon, prior to feeding the suspension into the unit, to a temperature between 300° C. and 500° C.

6. The process of claim 1, further comprising: heating the suspension of particulated biomass within the liquid hydrocarbon, prior to feeding the suspension into the unit, to a temperature between 380° C. and 400° C.

7. The process of claim 1, wherein the liquid hydrocarbon is obtained from a refinery stream.

8. The process of claim 1, further comprising: torrefying the suspension of particulated biomass within the liquid hydrocarbon prior to feeding the suspension into the unit.

9. The process of claim 1, further comprising: demineralizing a mineral-containing biomass material to form the biomass material prior to torrefying the biomass material, wherein following demineralization, the biomass material has a mineral content of less than about 2.5 weight percent based on a total composition of the biomass material.

10. The process of claim 9, wherein following demineralization, the biomass material has a mineral content of less than about 1 weight percent based on a total composition of the biomass material.

11. The process of claim 9, wherein following demineralization, the biomass material has a mineral content of less than about 0.5 weight percent based on a total composition of the biomass material.

12. The process of claim 9, wherein the step of demineralizing the mineral-containing biomass material to form the biomass material further comprises: soaking the mineral-containing biomass material with a solvent, and subsequently removing at least part of the solvent, wherein the solvent is selected from the group consisting of: an aqueous solvent, a mineral acid, an organic acid, an acetic acid and a carboxylic acid; and wherein the solvent has a pH of less than about 7.

13. The process of claim 9, wherein the step of demineralizing the mineral-containing biomass material to form the biomass material further comprises: soaking the mineral-containing biomass material with a solvent, and subsequently removing at least part of the solvent, wherein the solvent is selected from the group consisting of: an aqueous solvent, a mineral acid, an organic acid, an acetic acid and a carboxylic acid; and wherein the solvent has a pH between 2 and 5.

14. The process of claim 1, wherein the liquid hydrocarbon material is selected from the group consisting of naphtha, gasoil, light cycle oil, heavy cycle oil, atmospheric residuum, vacuum residuum, FCC bottoms, aromatic furfural extract, slurry oil, decant oil, de-asphalted oil, crude oil, atmospheric tower bottoms, atmospheric gas oil, vacuum gas oil, light vacuum gas oil, heavy vacuum gas oil, clarified slurry oil, hydrotreated vacuum gas oil, hydrotreated de-asphalted oil, coker gas oil, hydrotreated coker gas oil, and mixtures thereof.

15. The process of claim 1, wherein the heat-carrier material further comprises an inert material.

16. The process of claim 1 further comprising forming a biomass-catalyst mixture prior to the torrefying step.

17. The process of claim 16 wherein the biomass-catalyst mixture is formed in a kneader.

18. The process of claim 1 wherein the catalyst is an acidic catalyst.

19. The process of claim 1 wherein the catalyst is a basic catalyst.

20. The process of claim 1 wherein the catalyst is solid.

21. The process of claim 1 wherein the catalyst is in solution.

22. The process of claim 1 wherein in the step of mixing, the stable suspension comprises between 1 weight percent and 40 weight percent particulated biomass evenly distributed in the liquid hydrocarbon.

23. The process of claim 1 wherein the step of mixing the particulated biomass with the liquid hydrocarbon is performed in a high shear mixer.

24. The process of claim 1, wherein the step of torrefying the biomass material is performed at a temperature between 200° C. and 375° C.

* * * * *